US012770890B2

(12) United States Patent
Nomura et al.

(10) Patent No.: US 12,770,890 B2
(45) Date of Patent: Oct. 20, 2026

(54) POSITIVE ELECTRODE SHEET FOR AIR BATTERIES, A PROCESS OF FABRICATING THE SAME, AND AN AIR BATTERY USING THE SAME

(71) Applicant: NATIONAL INSTITUTE FOR MATERIALS SCIENCE, Ibaraki (JP)

(72) Inventors: Akihiro Nomura, Ibaraki (JP); Yoshimi Kubo, Ibaraki (JP); Emiko Fujii, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 683 days.

(21) Appl. No.: 18/272,812

(22) PCT Filed: Jan. 14, 2022

(86) PCT No.: PCT/JP2022/001021
§ 371 (c)(1),
(2) Date: Jul. 18, 2023

(87) PCT Pub. No.: WO2022/158376
PCT Pub. Date: Jul. 28, 2022

(65) Prior Publication Data
US 2024/0097147 A1 Mar. 21, 2024

(30) Foreign Application Priority Data
Jan. 25, 2021 (JP) ................................ 2021-009492

(51) Int. Cl.
*H01M 4/96* (2006.01)
*C01B 32/159* (2017.01)
(Continued)

(52) U.S. Cl.
CPC ............. *H01M 4/96* (2013.01); *C01B 32/159* (2017.08); *C01B 32/16* (2017.08); *H01M 4/88* (2013.01);
(Continued)

(58) Field of Classification Search
CPC .......... H01M 4/96; H01M 4/88; H01M 4/133; H01M 4/583; H01M 12/08
See application file for complete search history.

(56) References Cited

U.S. PATENT DOCUMENTS

2014/0234722 A1* 8/2014 Kyotani ................. B82Y 30/00 427/122
2017/0194650 A1 7/2017 Mihara et al.
2019/0108948 A1* 4/2019 Chai ...................... H01G 11/06

FOREIGN PATENT DOCUMENTS

WO 2016009935 A1 1/2016
WO WO-2020022822 A1 * 1/2020 ............ H01M 4/583

OTHER PUBLICATIONS

Xu et al. Adv. Funct. Mater. 22, 1279â1283 (Year: 2012).*
(Continued)

*Primary Examiner* — Christopher P Domone
(74) *Attorney, Agent, or Firm* — IP Business Solutions, LLC

(57) ABSTRACT

A positive electrode sheet for air batteries according to an embodiment of this invention comprises a waved fibrous carbon and has a BET method specific surface area in a range of 300 to 1200 $m^2/g$, a 5 to 1000 nm-diameter pore surface area in a range of 200 to 600 $m^2/g$, a 0.1 to 10 μm-diameter pore volume in a range of more than 2.0 to no more than 10.0 $cm^3/g$, a 2 to 1000 nm-diameter pore volume in a range of 1.0 to 5.0 $cm^3/g$, and a sheet density in a range of 0.05 to 0.23 $g/cm^3$.

20 Claims, 10 Drawing Sheets

(51) Int. Cl.
*C01B 32/16* (2017.01)
*H01M 4/88* (2006.01)
*H01M 12/08* (2006.01)
*H01M 4/86* (2006.01)

(52) U.S. Cl.
CPC ......... *H01M 12/08* (2013.01); *C01B 2202/02* (2013.01); *C01B 2202/22* (2013.01); *C01B 2202/32* (2013.01); *C01P 2002/01* (2013.01); *C01P 2004/03* (2013.01); *C01P 2006/10* (2013.01); *C01P 2006/12* (2013.01); *C01P 2006/14* (2013.01); *C01P 2006/40* (2013.01); *H01M 2004/8689* (2013.01)

(56) References Cited

OTHER PUBLICATIONS

Yang et al. Chem. Mater. 17, 6422-6429 (Year: 2005).*
Shen et al. Journal of the Electrochemical Society, 165 (11) A2833-A2839 (Year: 2018).*
Kang et al. WO-2020022822-A1 Machine Translation (Year: 2020).*
Nomura et al. "CNT Sheet Air Electrode for the Development of Ultra-High Cell Capacity in Lithium-Air Batteries" Scientific Report 7, Article No. 45596, 2017.
Nomura "Development of Lithium-Air Battery" Japan Solar Energy Society, vol. 46, No. 3 (Serial No. 275), pp. 23-28, 2020.
International Search Report issued for the International Application No. PCT/JP2022/001021.

* cited by examiner (b) CNT2

(a) CNT1

POSITIVE ELECTRODE SHEET FOR AIR BATTERIES, A PROCESS OF FABRICATING THE SAME, AND AN AIR BATTERY USING THE SAME

TECHNICAL FIELD OF THE INVENTION

The present invention relates generally to a positive electrode sheet for air batteries, a process of fabricating the same and an air battery using the same, and more particularly to a positive electrode sheet for air batteries using fibrous carbon, a process of manufacturing the same and an air battery using the same.

BACKGROUND OF THE INVENTION

In recent years, there has been mounting demand for the development of storage batteries lighter in weight and larger in capacity, i.e., higher in energy density to cope with widespread use of renewable energy and electrification of automobiles. Among secondary batteries expected to be achieved, a lithium air battery has the highest theoretical energy density and can possibly have an energy density much higher than that of lithium ion batteries now in widespread use.

A lithium air battery uses a lithium metal as a negative electrode active material and an atmospheric oxygen as a positive electrode active material. On discharge, there is a reaction taking place in which the lithium metal elutes out of the negative electrode ($Li \rightarrow Li^+ + e^-$) and the resulting lithium ion reacts at the positive electrode with oxygen absorbed from the air for precipitation of lithium peroxide. ($2Li^+ + 2e^- + O^2 \rightarrow Li_2O_2$).

On charge, the opposite reaction occurs for repeated charge-and-discharge. It is here noted that the positive electrode is also referred to as air electrode because of absorbing and desorbing oxygen in the air in conformity with a discharge-and-charge cycle.

A sheet-like electrode comprising carbon nanotubes has been developed as such a positive electrode (for instance, see Non-Patent Publication 1). Non-Patent Publication 1 reports that a slurry with monolayer or single-walled carbon nanotubes dispersed in isopropanol is subjected to suction filtration by way of a poly-tetrafluoroethylene (PTFE) filter to obtain a self-supporting or freestanding carbon nanotube sheet. By using such a carbon nanotube sheet as a positive electrode of an air battery, there was a drastically increased cell capacity obtained. However, fast discharge performance (discharge capacity at the time of taking currents at an increased output rate and a higher current density) remains insufficient. In view of cycle performance, too, there is some limit on the number of discharge-and-charge cycles.

In another report, another air battery is obtained by using an unwoven fabric sheet employing carbon nanotubes for a positive electrode (for instance, see Non-Patent Publication 2). Non-Patent Publication 2 reports that a linear single-walled carbon nanotube obtained by various fabrication processes is dispersed in a solvent and filtrated to obtain an unwoven fabric sheet wherein carbon nanotubes are coagulated into a bundle, leading to an improved cell capacity. Although Non-Patent Publication 2 teaches that fast discharge performance is improved by a choice of carbon nanotube production processes, it still falls short of practical use.

An electrode material for metal air batteries, including a porous carbon material having another carbon skeleton and pores is known (from Patent Publication 1 as an example). Patent Publication 1 reports that a resinous mixture is obtained by compatibilization of 10 to 90% by weight of carbonizable resin and 90 to 10% by weight of vanishing resin is subjected to phase separation, fixed, and carbonized by calcination by heating to obtain a porous carbon material having a bi-continuous structure portion formed of a carbonaceous skeleton and pores and having a structural period of 0.002 to 10 μm as calculated by X-ray scattering or X-ray CT; however, its fast discharge performance would be still insufficient.

PRIOR ART PUBLICATIONS

Patent Publications

Patent Publication 1: WO Publication No. 2016/009935

Non-Patent Publications

Non-Patent Publication 1: Akihiro Nomura et al., Scientific Reports 7, Article number: 45596, 2017

Non-Patent Publication 2: Akihiro Nomura, "Development of Lithium Air Batteries", Solar Energy, Vol. 46, No. 3 (the $257^{th}$ volume of the set), pp. 23-28, 2020

SUMMARY OF THE INVENTION

Subject Matter of the Invention

In view of the foregoing, an object of the present invention is to provide a positive electrode sheet for air batteries capable of achieving improved fast discharge performance, a process of fabricating the same, and an air battery using the same.

Means for Achieving the Object

The present invention provides a positive electrode sheet for air batteries which comprises a waved fibrous carbon and has a BET method specific surface area of 300 to 1200 $m^2/g$, a 5 to 1000 nm-diameter pore surface area of 200 to 600 $m^2/g$, a 0.1 to 10 km-diameter pore volume of more than 2.0 $cm^3/g$ to not more than 10.0 $cm^3/g$, a 2 to 1000 nm-diameter pore volume of 1.0 to 5.0 $cm^3/g$, and a sheet density of 0.05 to 0.23 $g/cm^3$, thereby accomplishing the aforesaid object.

The aforesaid 0.1 to 10 μm-diameter pore volume may be in a range of 2.5 to 9.0 $cm^3/g$.

The aforesaid 0.1 to 10 μm-diameter pore volume may be in a range of 2.6 to 8.7 $cm^3/g$.

The aforesaid 2 to 1000 nm-diameter pore volume may be in a range of 2.0 to 4.0 $cm^3/g$.

The aforesaid 2 to 1000 nm-diameter pore volume may be in a range of 2.5 to 3.5 $cm^3/g$.

The aforesaid waves may have a power spectrum component in a spatial frequency domain of 0.002 to 0.2 $nm^{-1}$.

The aforesaid BET method specific surface area may be in a range of 350 to 700 $m^2/g$.

The aforesaid BET method specific surface area may be in a range of 550 to 690 $m^2/g$.

The aforesaid sheet density may be in a range of 0.05 to 0.2 $g/cm^3$.

The aforesaid sheet density may be in a range of 0.07 to 0.19 $g/cm^3$.

The aforesaid fibrous carbon may be selected from a group consisting of carbon nanotubes, carbon nanohorns, and carbon nanofibers.

A part of the aforesaid fibrous carbon may be in a bundled state.

The aforesaid positive electrode sheet may have a porosity in a range of 80 to 95%.

The aforesaid positive electrode sheet may have a basis weight in a range of 2 to 3.5 mg/cm$^2$.

The process of fabricating the aforesaid positive electrode sheet for air batteries comprises dispersing the waved fibrous carbon in a solvent to obtain a pre-dispersion solution of the fibrous carbon, adding an additional solvent to the pre-dispersion solution to process the pre-dispersion solution with an ultrasonic wave having an oscillation frequency in a range of 20 to 60 kHz and a rated output of 30 to 95 W for 10 to 600 seconds to obtain a dispersion solution, and filtrating the dispersion solution through a filter, thereby achieving the aforesaid object.

The aforesaid fibrous carbon may have a BET method specific surface area in a range of 500 to 1200 m$^2$/g, and a 2 to 1000 nm-diameter pore volume in a range of 9.5 to 15.0 cm$^3$/g.

The aforesaid waves may have a power spectrum component in a spatial frequency domain of 0.002 to 0.2 nm$^{-1}$.

The aforesaid fibrous carbon may have a concentration of 0.005 to 0.3% by mass in the aforesaid dispersion solution.

The air battery according to the present invention comprises a positive electrode, a negative electrode, and metal ion conductive electrolyte filled up between the positive and the negative electrode wherein the aforesaid positive electrode comprises the aforesaid positive electrode sheet, thereby achieving the aforesaid object.

The aforesaid negative electrode may comprise a lithium metal layer, and the aforesaid metal ions may be lithium ions.

Advantages of the Invention

The present invention provides a positive electrode sheet for air batteries which comprises a waved fibrous carbon and has a BET method specific surface area in a range of 300 to 1200 m$^2$/g, a 5 to 1000 nm-diameter pore surface area in a range of 200 to 600 m$^2$/g, a 0.1 to 10 μm-diameter pore volume in a range of more than 2.0 cm$^3$/g to not more than 10.0 cm$^3$/g, a 2 to 1000 nm-diameter pore volume in a range of 1.0 to 5.0 cm$^3$/g, and a sheet density in a range of 0.05 to 0.23 g/cm$^3$. By satisfying such specific conditions, oxygen and metal ions such as lithium ions can be sufficiently diffused and affinity for an electrolyte can be improved, resulting in the provision of an air battery that has enhanced fast discharge performance and cycle performance.

In the process of fabricating a positive electrode sheet according to the present invention, waved fibrous carbon is dispersed in a solvent to obtain a pre-dispersion solution of fibrous carbon, and an additional solvent is then added to it to obtain a dispersion solution ultrasonically processed under the aforesaid given conditions. By passing such dispersion solution through a filter for filtration, there is the aforesaid positive electrode sheet obtained. The present process can be carried out without recourse to any special technique or any expensive equipment, leading to improved general versatility.

BRIEF EXPLANATION OF THE ACCOMPANYING DRAWINGS

MODES FOR CARRYING OUT THE INVENTION

Figure 1:
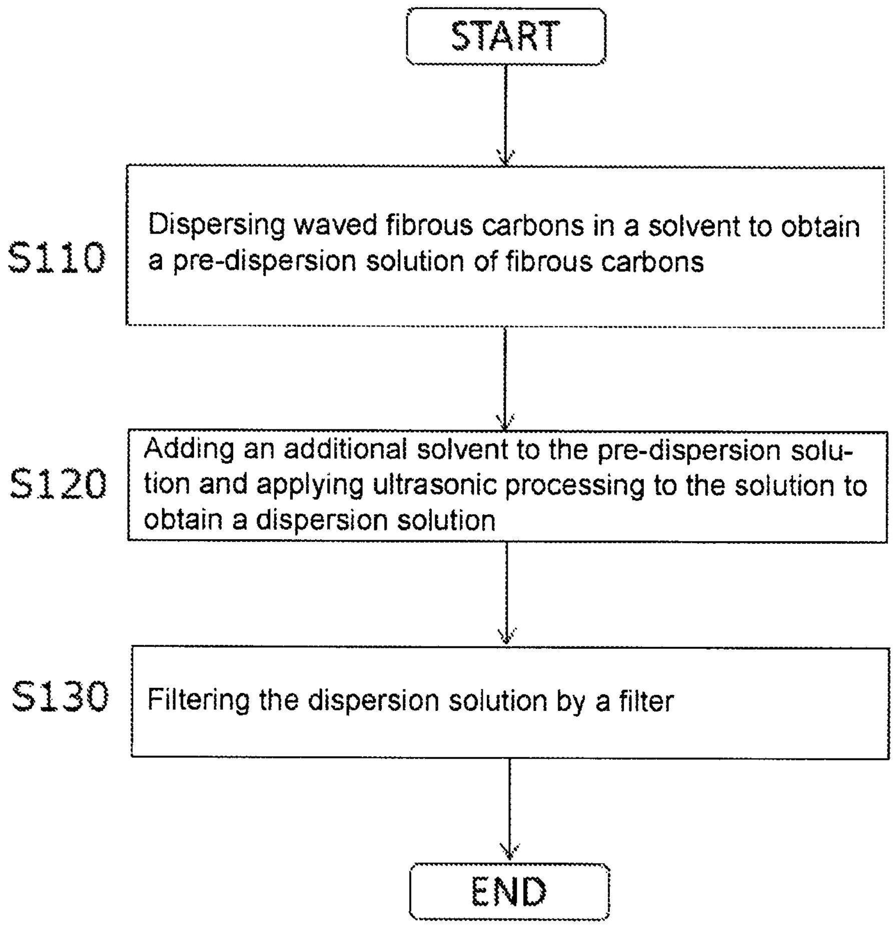
FIG. 1 is a flowchart showing the process steps of fabricating the positive electrode sheet for air batteries according to the invention.

Embodiments of the invention will now be explained with reference to the accompanying drawings. It is here noted that similar reference numerals are annexed to similar elements for omission of any explanation.

While explanations of the elements forming part of the invention, described below, may be based on a typical embodiment of the invention, it should be understood that the invention is in no sense limited thereto.

It should also be noted that the numerical range indicated by "to" includes the upper and lower limit values provided before and after "to".

Mode 1 for Carrying Out the Invention

In Mode 1 for carrying out the invention, the positive electrode sheet for air batteries according to the invention, and the process of fabricating the same will now be explained.

In order to improve the output and capacity of an air battery (such as a lithium air battery), an air electrode acting as a positive electrode should have electrical conductivity enough to operate as an electrode and, at the same time, have an electrochemically active surface on which a cell reaction takes place and a diffusion path through which oxygen and lithium ions that are a cell reaction product can be supplied to the electrochemically active surface. This diffusion path also plays a role of providing space in which a solid product precipitated by discharge reaction (mainly lithium peroxide ($Li_2O_2$) in the case of the lithium air battery) is allowed to grow in large amounts without inhibiting growth. That is, the positive electrode should have a continuous pore structure allowing substance diffusion to take place easily inside as well as a large pore volume and a large surface area.

From such a point of view, the inventors have tried to prepare a self-supportable or freestanding sheet using fibrous carbon having a nanoscale waved pattern for the purpose of controlling its pore volume and surface area in such a way as to allow it to be used as the positive electrode of an air battery. While reference will hereafter be primarily made to the case of applying the inventive sheet to the positive electrode of a lithium air battery, it should be appreciated that there is no limitation on the air battery as long as it exchanges air (oxygen) with the outside during discharge and charge: there is the mention of, in addition to lithium air batteries, sodium air batteries, air zinc batteries, air iron batteries, air aluminum batteries and air magnesium batteries.

Positive Electrode Sheet for Air Batteries

The positive electrode sheet for air batteries according to the invention (hereafter simply called the positive electrode sheet) comprises a waved fibrous carbon and has a BET method specific surface area in a range of 300 to 1200 $m^2/g$, a 5 to 1000 nm-diameter pore surface area in a range of 200 to 600 $m^2/g$, a 0.1 to 10 μm-diameter pore volume of more than 2.0 $cm^3/g$ to not more than 10.0 $cm^3/g$, and a 2 to 1000 nm-diameter pore volume in a range of 1.0 to 5.0 $cm^3/g$. By designing the positive electrode sheet having a particular BET method specific surface area and a particular pore surface area of a small nm order pore as well as having aforesaid pore volume range in two pore regions (that is, a pore of 0.1 to 10 μm in diameter and a pore of 2 to 1000 nm in diameter), thereby improving performance during fast discharge (rate performance). In addition, being the density of the positive electrode sheet according to the invention in the range of 0.05 to 0.23 $g/cm^3$ contributes more to permeation and diffusion of oxygen while maintaining strength enough for self-supporting. Thus, the positive electrode sheet of the invention is capable of providing an air battery having improved fast discharge performance (rate performance) and enhanced cycle performance.

The thickness of the positive electrode sheet, on which there is no particular limitation, is preferably in a range of 50 to 400 km in which it is capable of functioning properly as the positive electrode of an air battery. To make an air battery smaller in size and better in terms of discharge performance and cycle performance, its thickness is more preferably in a range of 100 to 200 μm.

Fibrous Carbon

The fibrous carbon used herein stands for a carbon composed of a monoatomic layer sheet-like carbon bonded by sp2 hybrid orbital and in a fibrous form having an average diameter of 0.1 to 50 nm and an average length of the order of 1 to 100 μm. In general, the average aspect ratio of fibrous carbon (an average of fibrous carbon's length to diameter ratio: length/diameter) is preferably greater than 100, and more preferably greater than 500. The upper limit, on which there is no particular limitation, is preferably not more than 100000. Referring generally to fibrous carbon, the smaller its diameter and the higher its aspect ratio is, the stronger the mutual cohesive force is; hence, an unwoven fabric aggregate with a thick bundle of a series of carbon fibers is likely to occur. The then bundle has a width of about 0.1 to 10 μm, as exemplified later.

For instance, when the carbonizable resin and vanishing resin (binder) are used according to Patent Publication 1, fibrous carbon is generated from the resin; in this case, however, any monoatomic layer sheet-like carbon bonded via sp2 hybrid orbital is not obtained It is herein noted that the average aspect ratio means a value calculated out of the fiber length and diameter of one hundred carbon fibers observed through a scanning electron microscope as an average length/diameter value.

The fibrous carbon forming part of the positive electrode sheet according to the invention has waves defined by an undulation found upon observation of the positive electrode sheet through an electron microscope or the like as an example. Simply and clearly, if a periodical shape pattern having a spacing of 5 to 500 nm in size is identified as a result of observation of fibrous carbon forming part of the positive electrode sheet by virtue of an electron microscope etc., it would then be considered to have waves. More precisely, if a positive electrode sheet has a power spectrum components in a range of spatial frequency of 0.002 to 0.2 $nm^{-1}$ from the Fourier transform analysis of real space images taken of the components forming the positive electrode by an electron microscope or the like, it would then have waves. If this requirement is satisfied, the positive electrode sheet would then have the aforesaid two pore regions with a predetermined pore volume.

More preferably, the waved fibrous carbon forming part of the positive electrode sheet according to the invention has a periodical wave pattern smaller than that of the starting fibrous carbon within a period range of the aforesaid shape pattern or a range of the aforesaid spatial frequency and a power spectrum component in a larger spatial frequency domain. This makes it possible for the aforesaid two pore regions to be formed with a predetermined pore volume while taking advantage of the waves of the starting fibrous carbon. It is here noted that the starting fibrous carbon will be explained in greater details with reference to the process of fabricating a positive electrode sheet for air batteries as described later.

The fibrous carbon is preferably selected from the group consisting of carbon nanotubes, carbon nanohorns, and carbon nanofibers that are all commercially available. Among others, preference is given to carbon nanotubes because they are so cylindrical in shape that the aforesaid pore volume and BET method specific surface area are easily achievable.

When the carbon nanotubes are used as the fibrous carbon, the lower limit value of the average aspect ratio is preferably at least 2000, more preferably at least 2500, and most preferably at least 3000. As the average aspect ratio of carbon nanotubes is greater than the aforesaid lower limit value, it allows carbon nanotubes to be more strongly entangled with one another, resulting in a positive electrode sheet having enhanced strength.

The upper limit value of the carbon nanotubes' average aspect ratio is preferably at most 100000, and more preferably at most 5000. As the average aspect ratio is not more than the aforesaid upper limit value, it enables a positive electrode sheet to be produced in high yields because the carbon nanotubes have more improved dispersibility.

The carbon nanotubes used herein, on which there is no particular limitation, may include a monolayer or single-walled carbon nanotube (SWNT: single-walled carbon nanotube), and a multilayer carbon nanotube (MWNT: multi-walled carbon nanotube). In the present disclosure, the double layer carbon nanotube (DWNT) is to be included in the multilayer carbon nanotube. Among others, preference is given to SWNT because when it is applied as the positive electrode of a lithium air battery, there is more improved battery performance obtained.

As mentioned above, a part of fibrous carbon may be in a bundle form contributing more to increased strength and, hence, resulting easily in a self-supporting sheet with the aforesaid pore volume. The then bundle width is preferably in a range of 0.1 μm to 10 μm.

BET Method Specific Surface Area

The positive electrode sheet of the invention has a BET (Brunauer Emmett Teller) method specific surface area in a range of 300 to 1200 $m^2/g$. As the BET method specific surface area is at least 300 $m^2/g$, it causes the efficiency of ion transport to be so improved that when lithium ions react with oxygen to generate lithium peroxide as an example, the reaction site needed for allowing oxygen to receive electrons fed from the positive electrode is then ensured resulting in increased discharge capacity. On the other hand, as the BET method specific surface area is not greater than 1200 $m^2/g$, it can hold back any contribution to battery side reactions on the positive electrode surface, resulting in preferred discharge/charge performance. It should here be noted that the BET method specific surface area is found by rounding off the first decimal place.

The lower limit value of the BET method specific surface area is preferably at least 350 $m^2/g$, more preferably at least 550 $m^2/g$, and most preferably at least 620 $m^2/g$ in which there is large discharge capacity obtained. The upper limit value is, on the other hand, preferably at most 700 $m^2/g$, and more preferably at most 690 $m^2/g$ in which side reactions are held back, leading to preferable discharge/charge performance. While the lower or upper limit value of the BET method specific surface area may arbitrarily be set within the aforesaid range, the BET method specific surface area of the positive electrode sheet may be in a range of, for instance, 350 to 700 $m^2/g$, 550 to 690 $m^2/g$, and 620 to 690 $m^2/g$.

Surface Areas of Pores of 5 to 1000 nm in Diameter

The positive electrode sheet of the invention may have a surface area of pores of 5 to 1000 nm in diameter in a range of 200 to 600 $m^2/g$. This pore surface area may be calculated by the BJH (Barrett Joyner Halenda) method from adsorption isothermal curves obtained by nitrogen adsorption with rounding off the first decimal place.

The pores of 5 to 1000 nm in diameter function as a battery reaction surface (reaction site). To the pores having a diameter in this range, lithium ions and oxygen may be rapidly supplied during discharge reaction to form lithium peroxide. In other words, the pores having such a diameter contribute to improved fast discharge performance. In the pores having the aforesaid diameter, lithium peroxide passes electrons to the positive electrode, leading to more reaction sites where it turns to lithium ions and oxygen and, hence, making electron transfer more efficient. It is thus possible to provide a battery having more improved discharge/charge performance.

In view of ensuring such reaction sites thereby obtaining improved discharge/charge performance, the lower limit value of the aforesaid pore surface area is at least 200 $m^2/g$. In view of making the positive electrode sheet have enough strength and the self-support capability of the positive electrode sheet higher, on the other hand, the upper limit value of the aforesaid pore surface area is preferably at most 600 $m^2/g$.

In view of obtaining more improved discharge/charge performance, the lower limit value of the aforesaid pore surface is preferably at least 300 $m^2/g$, and more preferably at least 340 $m^2/g$. In view of making the self-supporting capability of the positive electrode sheet much higher, the upper limit value of the aforesaid pore surface area is preferably at most 500 $m^2/g$, and more preferably less than 400 $m^2/g$. While the lower and upper limit values may be arbitrarily set within the aforesaid range, the pore surface area of the positive electrode sheet may be in a range of, for instance, 300 to 500 $m^2/g$ inclusive of at least 340 $m^2/g$ and less than 400 $m^2/g$.

Pore Volume of Pores of 0.1 to 10 μm in Diameter

The pore volume of pores of 0.1 to 10 km in diameter in the positive electrode sheet of the invention are in a range of more than 2.0 $cm^3/g$ and no more than 10.0 $cm^3/g$. The pore volume of pores of 0.1 to 10 μm in diameter is obtained using a value measured by the mercury penetration method. It is here noted that this pore volume is found by rounding off the second decimal place.

The pores in this region work mainly as a path for permitting oxygen on the outside of a battery to enter the inside of the positive electrode sheet. By allowing the pore volume in this region to satisfy the aforesaid range, lithium ions react with oxygen into lithium peroxide upon which oxygen enters the inside of the positive electrode sheet fast in sufficient amounts. Thus, if the positive electrode sheet of the invention is used, it is then possible to provide a battery that has increased discharge capacity at high current densities or enhanced fast discharge performance.

Upon charge, lithium peroxide passes electrons to the electrode to turn into lithium ions and oxygen. Then, if the pore volume of pores of 0.1 up to 10 μm is in this range, the generated oxygen passes more easily out of the positive electrode sheet, making fast charge possible.

In view of making faster discharge/charge possible, the lower limit value of the pore volume of pores of 0.1 to 10 μm in diameter is preferably at least 2.5 $cm^3/g$, and more preferably at least 2.6 $cm^3/g$. In view of making the positive electrode sheet have enough strength and the self-supporting capability of the positive electrode sheet higher, on the other hand, the upper limit value of the aforesaid pore volume is preferably at most 9.0 $cm^3/g$, and more preferably at most 8.7 $cm^3/g$. While the lower and upper limit values of the pore volume may be arbitrarily set within the aforesaid range, the pore volume of pores of 0.1 to 10 μm in diameter of the positive electrode sheet may be in a range of, for instance, 2.5 to 9.0 $m^3/g$ including 2.6 to 8.7 $m^3/g$.

Referring typically to a prior art process of Patent Publication 1 wherein various carbonaceous materials inclusive of carbon material are each kneaded with a binder (resin component) and then molded into a sheet form, it has been known that pores of 0.1 to 10 μm in diameter are crushed by filling of the binder component. In turn, oxygen has difficulty entrance, unlikely leading to any improvement in fast discharge performance.

Pore Volume of Pores of 2 to 1000 nm in Diameter

The pore volume of pores of 2 to 1000 nm in diameter of the positive electrode sheet for air batteries according to the invention is in a range of 1.0 to 5.0 $cm^3/g$. This pore surface area of pores of 2 to 1000 nm in diameter may be calculated by the BJH (Barrett Joyner Hallenda) method from adsorption isothermal curves obtained by nitrogen adsorption methods. It is here noted that the pore volume is found by rounding off the second decimal place.

The pores having a diameter in this range functions as a battery or cell reaction surface (reaction site); the pore volume is so large that there is an increase in the amount of lithium ions, oxygen and electron taking part in reaction per unit time upon discharge reaction, resulting in enhanced fast discharge performance. In the charge reaction, there are more reaction sites occurring where lithium peroxide passes electrons to the positive electrode and turns into lithium ions and oxygen so that more electrons can be exchanged. It is consequently possible to provide a battery more enhanced in terms of discharge-and-charge performance.

In view of providing a battery having more enhanced discharge-and-charge performance, the lower limit value of the pore volume of pores of 2 to 1000 nm in diameter is preferably at least 2.0 $cm^3/g$, and more preferably at least 2.5 $cm^3/g$. In view of making the positive electrode sheet have enough strength and keeping the self-supporting capability of the positive electrode sheet higher, on the other hand, the upper limit value of the aforesaid pore volume is preferably at most 4.0 $cm^3/g$, and more preferably at most 3.5 $cm^3/g$. While the lower and upper limit values of the pore volume of pores of 2 to 1000 nm in diameter may be arbitrarily set within the aforesaid range, the pore volume of pores of 2 to 1000 nm in diameter of the positive electrode sheet may be in a range of, for instance, 2.0 to 4.0 $m^3/g$ inclusive of 2.5 to 3.5 $cm^3/g$.

D/G

The intensity ratio D/G, where G stands for a peak intensity obtained from Raman spectrometry and derived from crystal structure carbon and D stands for a peak intensity derived from turbostratic structure carbon, is preferably in a range of 0.1 to 1.0. Such relatively low crystallinity ensures that the affinity of the sheet for the electrolyte is so increased that an air battery having enhanced cycle performance is obtainable. It is here noted that the ratio D/G is calculated with rounding off the second decimal place.

In view of obtaining an air battery having more improved cycle performance, the lower limit value of D/G is preferably at least 0.2, and more preferably at least 0.3 whereas the upper limit value of D/G is preferably at most 0.8, and more preferably at most 0.6. While the lower and upper limit values of D/G may be arbitrarily set within the aforesaid range, the D/G of the positive electrode sheet may be in a range of, for instance, 0.2 to 0.8 inclusive of 0.3 to 0.6.

Sheet Density

The positive electrode sheet of the invention has a sheet density (also called the apparent density) is in a range of 0.05 to 0.23 $g/cm^3$. In turn, this leads to a positive electrode sheet having the pores needed and enough for permeation and diffusion of oxygen and enhanced strength.

In view of allowing the positive electrode sheet to have more enhanced strength, the lower limit value of sheet density is preferably at least 0.07 $g/cm^3$, and more preferably at least 0.1 $g/cm^3$. In view of providing a positive electrode sheet having enough pores, on the other hand, the upper limit value of the sheet density is preferably at most 0.2 $g/cm^3$, and more preferably at most 0.19 $g/cm^3$. While the lower and upper limit values of sheet density may be arbitrarily set within the aforesaid range, the sheet density may be in a range of, for instance, 0.05 to 0.2 $g/cm^3$ inclusive of 0.07 to 0.19 $g/cm^3$.

Porosity

The positive electrode sheet of the invention preferably has a porosity in a range of 80 to 95%. A positive electrode sheet with a porosity of at least 85% is capable of storing lithium peroxide generated upon discharge in large amounts and making resistance to entrance inside of oxygen or oxygen-containing air low, thereby providing a battery having high discharge capacity and fast discharge capability. On the other hand, a porosity of at most 95% makes positive electrode sheet strength higher.

It is here appreciated that the porosity is found from the following formula: [1−(positive electrode sheet's apparent density/real density of positive electrode sheet-forming material)]×100.

In view of providing a battery having higher discharge capacity and capable of faster discharge, the lower limit value of porosity is more preferably at least 90%. In view of making the positive electrode sheet have more enhanced strength, on the other hand, the upper limit value of porosity is more preferably at most 94%.

Basis Weight

The positive electrode sheet of the invention has a basis weight in a range of 2 to 3.5 $mg/cm^2$, thereby allowing an air battery using the positive electrode sheet to have high discharge capacity and fast discharge capability. The basis weight is found as mass per area by punching out the positive electrode sheet of interest into a circle of 16 mm in diameter (ϕ) and measure its mass (mg) that is then divided by a circle's area ($cm^2$). The basis weight is more preferably in a range of 2 to 3.2 $mg/cm^2$.

Process of Fabricating the Positive Electrode Sheet for Air Batteries

How to fabricate the aforesaid positive electrode sheet for air batteries will now explained.

FIG. 1 is a flowchart illustrative of process steps of fabricating the positive electrode sheet for air batteries according to the invention.

In Step S110, waved fibrous carbon is dispersed in a solvent to obtain a pre-dispersion solution of fibrous carbon.

The fibrous carbon stands for a material containing a monoatomic layer sheet-like carbon bonded mainly by sp2 hybrid orbital, for which the aforesaid fibrous carbon is used. The starting fibrous carbon has preferably a BET method specific surface area in a range of 500 to 1200 $m^2/g$ and a pore volume of pores of 2 to 1000 nm in diameter in a range of 9.5 to 15.0 $cm^3/g$. By permitting the starting fibrous carbon to have a BET method specific surface area in the aforesaid range, there is a positive electrode sheet obtained, which maintains reaction sites and has self-supporting capability. By allowing the starting fibrous carbon to have a pore volume in the aforesaid range, there can be a battery provided, which has more reaction sites for discharge reactions and enhanced discharge performance.

In view of easily obtaining a positive electrode sheet having a predetermined structure and given physical properties, the BET method specific surface area of the starting fibrous carbon is more preferably in a range of 550 to 650 $m^2/g$.

In view of easily obtaining a positive electrode sheet having a predetermined structure and given physical properties, the pore volume of pores of 2 to 1000 nm in diameter of the starting fibrous carbon is more preferably in a range of 9.8 to 12 $cm^3/g$.

The fact that the starting fibrous carbon has also some waves may simply be identified by way of observations under an electron microscope or the like, as is the case with fibrous carbon forming a positive electrode sheet: if the fibrous carbon has a periodical shape pattern of 5 to 500 nm in size, it may be judged as having waves. More precise identification may rely on Fourier transform analysis of real space images of fibrous carbon by an electron microscope or the like in which if the fibrous carbon has a power spectral component in a range of 0.002 to 0.2 $nm^{-1}$ in spatial frequency, it may then be judged as having waves. By using the waved fibrous carbon as the starting material, it is then possible to fabricate a positive electrode sheet in high yields, which sheet is provided with pores having two different sizes (diameters) and has a predetermined pore volume.

Water and generally available organic solvents may be used as the solvent. By way of example but not by way of limitation, the organic solvent usable herein may include N-methyl-2-pyrollidone, dimethylsulfoxide and N,N-dimethylformamide as well as hydrocarbon solvents inclusive of various alcohols (for instance, methanol, ethanol, and isopropanol), ethers, esters, carbonates and aromatic hydrocarbons. The solvent may be composed of a single solvent or a solvent mixture.

The solvent used herein is preferably water that makes it easy to obtain a dispersion solution having fibrous carbon dispersed therein under specific ultrasonic processing conditions to be described later. Water may be tap water, distilled water, ion exchanged water, pure water, and ultrapure water.

No particular limitation is on how to disperse; for instance, dispersion may be carried out using a homogenizer or a bead mill.

It is understood that although there is no particular limitation on the concentration of fibrous carbon in the pre-dispersion solution, it may be higher than that used in Step S120 described later. In one example, the concentration is 0.05 to 5% by mass, and preferably 0.1 to 0.5% by mass for the purpose of preventing fibrous carbon from being lumped thereby accelerating uniform dispersion.

In Step S120, an additional solvent is applied to the pre-dispersion solution obtained in Step S110, and the resulting product is ultrasonically processed to obtain a dispersion solution. The conditions for ultrasonic processing comprise irradiation of ultrasonic waves having an oscillation frequency ranging from 20 kHz to 60 kHz, and a rated output ranging from 30 W to at most 95 W for 10 to 600 seconds.

By carrying out ultrasonic processing in such a way as to meet such specific conditions, there is a dispersion solution obtained, in which fibrous carbon remains partly bundled without falling to pieces and fibrous carbon waves are maintained. From experimentation, the inventors have found that there can be a self-supporting positive electrode sheet obtained, which has a specific pore volume in the aforesaid two pore regions and a large BET method specific surface area.

More preferably, the dispersion solution is irradiated with ultrasonic waves having an oscillation frequency in a range of 30 to 50 kHz and a rated output in a range of 30 to 65 W for 40 to 70 seconds so that the positive electrode sheet can be obtained in high yields.

The ultrasonic processing may be carried out at room temperature, under cooling conditions (for instance, in an ice bath) or under heating conditions. Such ultrasonic processing may be carried out with the aid of an ultrasonic homogenizer.

The solvent added to the pre-dispersion solution may be the same as or different from the solvent explained with reference to Step S110. Preference is given to the same solvent. The solvent is added such that the concentration of fibrous carbon in the dispersion solution is preferably in a range of 0.005 to 0.3% by mass for the purpose of promoting dispersion by ultrasonic processing. More preferably, the concentration of fibrous carbon is in a range of 0.01 to 0.1% by mass.

In Step S130, the dispersion solution obtained in Step S120 is filtrated through a filter.

By way of example, but not by way of limitation, the filter used herein may include a polytetrafluoroethylene (PTFE) membrane, a polyvinylidene fluoride (PVDF) membrane made hydrophilic on its surface, and a glass fiber membrane.

Although there is no particular limitation on how to filtrate, preference is given to suction filtration (also called filtration under reduced pressure) or pressure filtration, ensuring that a self-supporting sheet having entangled fibrous carbons is more likely to occur as compared with natural filtration. After removal of filtrates on the filter there is the aforesaid positive electrode sheet left.

The filtrates may then dried for solvent removal, and drying may be carried out in vacuo at a temperature ranging from 50 to 150° C. for 1 to 24 hours. Such drying may be carried out prior to removal.

Mode 2 for Carrying Out the Invention

In Mode 2 for carrying out the invention, an air battery using the positive electrode sheet for air batteries according to the invention will now be explained.

Figure 2:
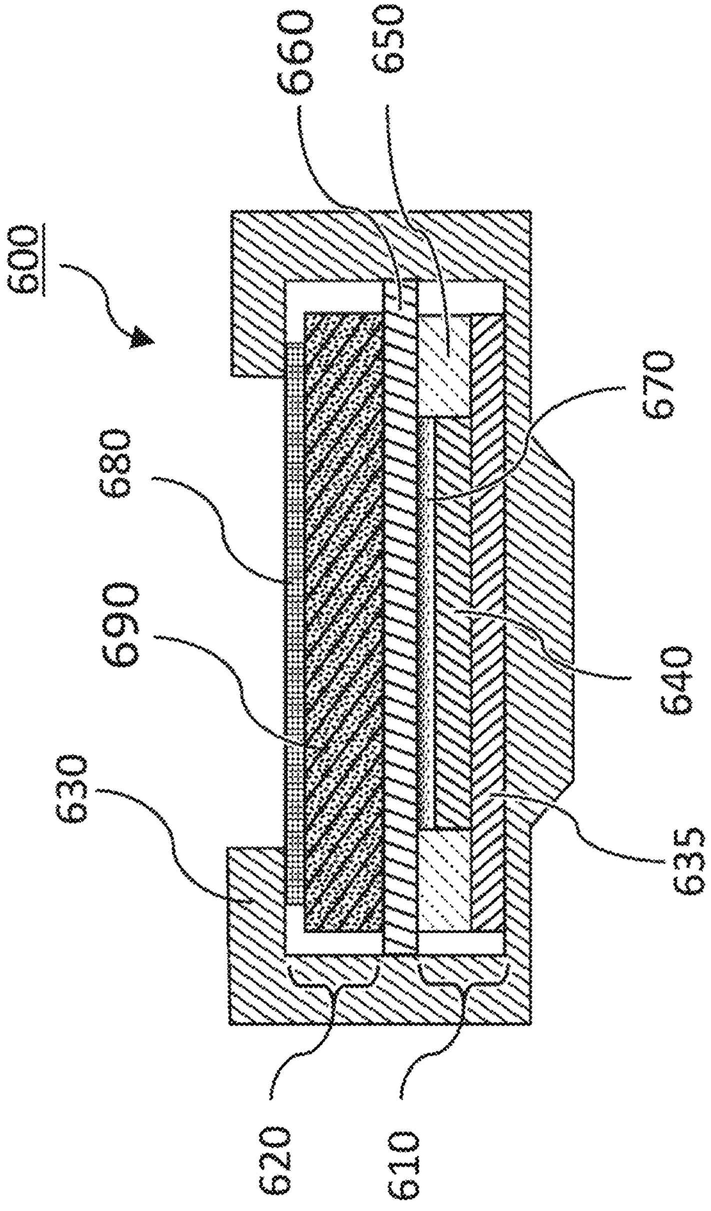
FIG. 2 is a schematic sectional view of an air battery according to one embodiment of the invention.

FIG. 2 is a schematic sectional view of the air battery according to one embodiment of the invention.

An air battery 600 called generally a "coin cell" comprises a stacked assembly wherein a negative electrode structure 610 (to be described later) and a positive electrode structure 620 (to be described later) are stacked together through a separator 660, and a cramp or holder assembly 630 for cramping this stacked assembly.

It is here noted that an insulating O-ring (not shown) is located between the cramp assembly 630 and a metal mesh 680, as described later, to ensure insulation of the cramp assembly 630 from the positive electrode structure 620.

As can be understood from the fact that the air battery is named in a sense of atmospheric oxygen acting as a positive electrode active substance, the air battery is capable of discharging by supply of an air containing about 21% oxygen. To reduce influences of diffusion control, however, it is preferable to feed a gas containing oxygen in higher concentrations, and it is more preferable to feed pure oxygen because the highest performance is obtainable.

A negative electrode structure 610 is made up of a negative electrode collector 635, a metal layer 640 that is a negative electrode active substance layer arranged on the negative electrode collector 635, and columnar spacers 650 arranged on both its ends with a space 670 between the metal layer 640 and a separator 660, which space is filled up with an electrolyte capable of transmission of metal ions such as alkaline metal ions or alkaline earth metal ions.

The metal layer 640 contains an alkaline metal and/or an alkaline earth metal. Among others, a layer comprising a lithium metal is preferable. When the electrolyte is capable of conduction of lithium ions and the negative electrode structure 610 has a lithium metal, it is possible to provide a lithium air battery.

The positive electrode structure 620 comprises a positive electrode sheet 690 in mechanically and electrically connection with a metal-containing mesh (metal mesh) 680 that is a positive electrode collector. In this case, the metal mesh 680 that is a positive electrode substrate also functions as a passage through which air or oxygen passes. The positive electrode sheet 690 will not be explained anymore because it is the positive electrode sheet explained with reference to Mode 1 for carrying out the invention. While FIG. 2 shows that the positive electrode structure 620 comprises the metal mesh 680, it is understood that it may not include the metal mesh 680 because the positive electrode sheet 690 has self-supporting capability. This in turn makes weight reductions possible.

The separator 660 is located between the negative electrode structure 610 and the positive electrode structure 620 for separation of both.

How to fabricate the air battery 600 will then be explained. First of all, the negative electrode structure 610 is prepared. The metal layer 640 formed of lithium or the like and having a disc form that is concentric with, and smaller in diameter than, the negative electrode collector 635 is stacked on the disc-like negative electrode collector 635, and the columnar spacer 650 is pressed on the negative electrode collector 635 for preparation of the negative electrode structure 610.

The spacer 650 is an insulator that may be made up of materials such as a metal oxide, a metal nitride, and a metal oxide/nitride exemplified by $Al_2O_3$, $Ta_2O_5$, $TiO_2$, ZnO, $ZrO_2$, $SiO_2$, $B_2O_3$, $P_2O_5$, $GeO_2$, $Li_2O$, $Na_2O$, $K_2O$, MgO, CaO, SrO, BaO, $Si_3N_4$, AlN, and $AlO_xN_{1-x}$ ($0<x<1$), among which $Al_2O_3$, and $SiO_2$ is preferred because of excelling in availability and process capability.

The spacer 650 may also be a resin exemplified by a polyolefin-base resin, a polyester-base resin, a polyimide-base resin, and a polyether ether ketone (PEEK)-base resin. Typically, the polyolefin-base resin includes polyethylene, and polypropylene; and the polyester-base resin includes polyethylene terephthalate (PET), polybutylene terephthalate (PBT), polyethylene naphthalate (PEN), and polytributylene terephthalate (PTT). These resins are preferred because of excelling in availability and process ability.

The separator 660 is then prepared, and pressed upon the spacer 650.

The separator 660 is a porous insulator capable of transmission of alkaline metal ions, and/or alkaline earth metal ions. The separator 660 is formed of any desired inorganic material (inclusive of a metal material) and an organic material, both of which have no reactivity on the metal layer 640 and electrolyte.

The separator 660 may be made up of a material such as resins exemplified by polyethylene, polypropylene, and polyolefin or, alternatively, glass. The separator 660 may also be made up of an unwoven fabric material.

A space 670 is located between the metal layer 640 (lithium metal), spacer 650 and separator 660.

Thereafter, the separator 660 is filled up inside with an electrolyte and, at the same time, the space 670 is filled up with the electrolyte, too.

Any desired aqueous or nonaqueous electrolyte containing an alkaline metal salt and/or an alkaline earth metal salt may be used as the electrolyte. When the aqueous electrolyte contains a lithium salt, for instance, LiOH, LiCl, $LiNO_3$, and $Li_2SO_4$ may be used as the lithium salt. It is here noted that water, or a water-soluble solvent may be used as the solvent.

When the nonaqueous electrolyte contains a lithium salt, for instance, $LiNO_3$, $LiPF_6$, $LiBF_4$, $LiSbF_6$, $LiSiF_6$, $LiAsF_6$, $LiN(SO_2C_2F_5)_2$, $Li(FSO_2)_2N$, $LiCF_3SO_3(LiTfO)_6$, $Li(CF_3SO_2)_2N$(LiTFSI), $LiC_4F_9SO_3$, $LiClO_4$, $LiAlO_2$, $LiAlCl_4$, and $LiB(C_2O_4)_2$ may be used as the lithium salt.

The nonaqueous electrolyte contains as the non-aqueous solvent grimes (monogrime, digrime, trigrime, tetragrime), methylbutyl ether, diethyl ether, ethylbutyl ether, dibutyl ether, polyethylene glycol dimethyl ether, tetraethylene glycol dimethyl ether, cyclohexanone, dioxane, dimethoxyethane, 2-methyltetrahydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, polyethylene carbonate, γ-butyrolactaone, decanolide, valerolactone, mevalonolactone, caprolactone, acetonitrile, benzonitrile, nitromethane, nitrobenzene, triethylamine, triphenylamine, tetraethylene glycol diamine, dimethylformamide, diethylformamide, N-methylpyrrolidone, dimethylsulfone, tetramethylsulfone, triethylphosphine oxide, 1,3-dioxolane, and sulfolane.

Thereafter, the positive electrode structure 620 having the metal mesh 680 arranged on the positive electrode sheet 690 is prepared.

For instance, a mesh containing at least one metal selected from the group consisting of copper (Cu), tungsten (W), aluminum (Al), nickel (Ni), titanium (Ti), gold (Au), silver (Ag), platinum (Pt) and palladium (Pd) may be used. That is, a mesh comprising a single metal selected from this group, an alloy containing a metal selected from this group, and a compound of a metal selected from this group with carbon (C), nitrogen (N) and the like may be used. The mesh may have a thickness of 0.2 mm and an aperture of 1 mm.

After that, the positive electrode structure 620 is laminated onto the negative electrode structure 610 filled up inside the space 670 with the electrolyte via the separator 660, and they are then assembled by the cramp 630 into the air battery 600. It is here noted that assembling is preferably carried out in dry air, for instance, dry air with a dew point of −50° C. or lower.

By way of the process steps as mentioned above, the coin cell type air battery 600 is fabricated.

While the air battery 600 contains the positive electrode sheet 690 and metal mesh 680 as the positive electrode structure 620, it is understood that the air battery according to the invention is in no sense limited thereto; the air battery may contain only the positive electrode sheet 690 as the positive electrode structure 620.

Because the positive electrode structure 620 having the positive electrode sheet 690 excels in air or oxygen permeation, is capable of taking in much more oxygen, and has high efficiency in terms of ion transport and wide reaction sites, the fabricated air battery 600 has enhanced discharge performance despite of its small size and weight and, hence, it has large capacity.

In what follows, another embodiment according to the invention will be explained with reference to the stacked metal battery (air battery) shown in the drawings.

Figure 3:
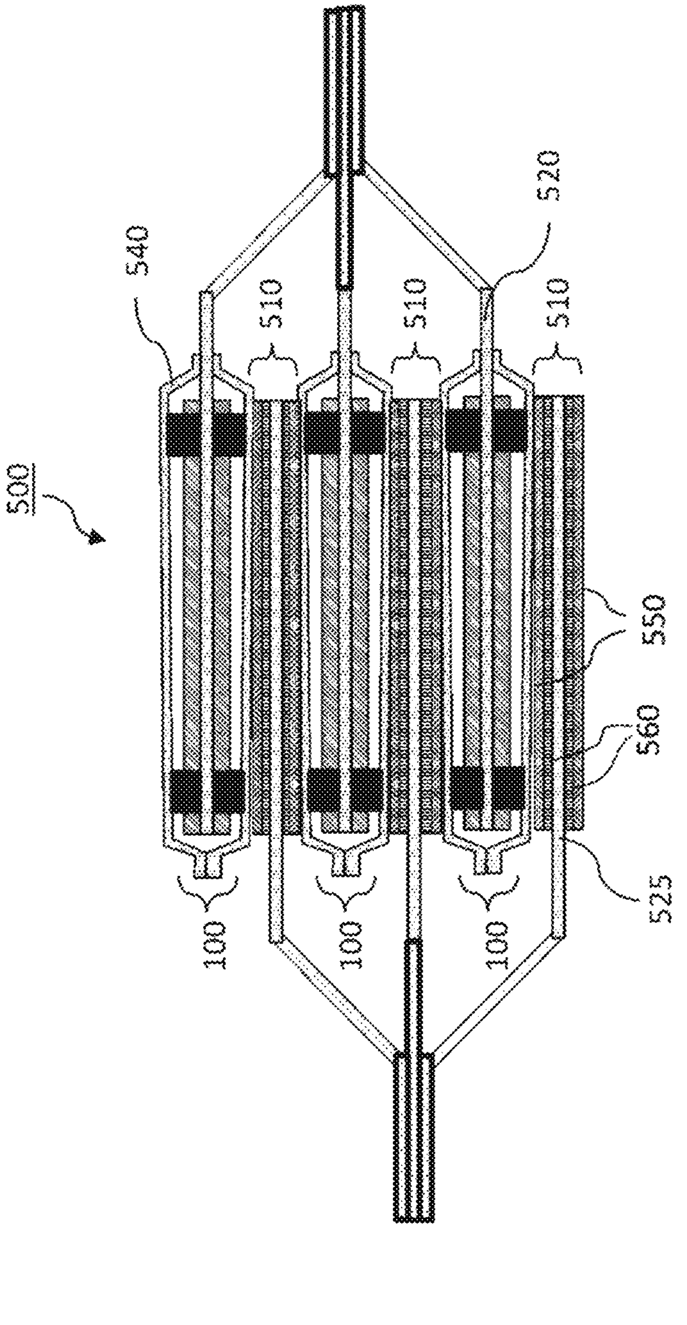
FIG. 3 is a schematic sectional view of a stacked metal battery according to another embodiment of the air battery according to the invention.

FIG. 3 is a schematic sectional view of a stacked metal battery or air battery according to another embodiment of the invention.

An air battery 500 according to the invention has a stacked structure in which a positive electrode structure 510 and a negative electrode structure 100 are stacked upon one another via a separator 540. Referring here to the number of stacks, the number of pairs may be one or two or more with a pair of positive and negative electrode structures 510 and 100 as unit, and there is no particular upper limitation on the number of pairs.

It is here noted that the negative electrode structure 100 is made up of a pair of negative electrode active substance layers (metal layers) and a negative electrode collector 520 sandwiched between them. Spacers are arranged on both ends of the metal layers to provide space between the metal layers and the separator 540. In this respect, the negative electrode structure 100 is similar in structure to the negative electrode structure 610 of the aforesaid air battery 600.

On the other hand, the positive electrode structure 510 is made up of a pair of stacks comprising a positive electrode sheet 550 and a gas diffusion layer 560, and a positive electrode collector 525 sandwiched between the stacks. It is here noted that the gas diffusion layer 560 and positive electrode sheet 550 are located in order from the positive electrode collector 525, and that the positive electrode sheet 550 will not be explained anymore because of being the same as in Embodiment 1.

This positive electrode collector 525 also functions as an air or oxygen passage thereby allowing the present air battery 500 to have a more increased capacity with a simpler structure.

The negative and positive electrode collectors 520 and 525 may be made up of, for instance, a metal such as copper (Cu), tungsten (W), aluminum (Al), nickel (Ni), titanium (Ti), gold (Au), silver (Ag), platinum (Pt), and palladium (Pd) as well as an alloy of these and a compound of these (for example, a compound with carbon and/or nitrogen). It is here noted that the air battery 500 may be housed in a container (not shown).

In the air battery 500, the positive electrode structure 510 is provided between the positive electrode sheet 550 and the positive electrode collector 525 with the gas diffusion layer 560 through which air, oxygen or other gas go back and forth between the outside of the battery and the positive electrode sheet 550. The gas diffusion layer also functions as an electron transfer path between the positive electrode sheet 550 and the positive electrode collector 525. The gas diffusion layer, because of working as a gas transfer passage, is required to not only have an air-permeable communicating opening but also have electron conductivity. For the gas diffusion layer, for instance, Carbon Paper TGP-H (TORAY) or Kureka E704 (KUREHA) may be used.

It should be understood that the positive electrode sheet of the invention may be applied to just only the aforesaid lithium air battery but also other metal air batteries inclusive of sodium air batteries, air zinc batteries, air iron batteries, air aluminum batteries, and air magnesium batteries.

It should be noted that while the present invention will be explained in further details with reference to some specific examples, the invention is in no sense limited to them.

EXAMPLES

Starting Material

In the fabrication of sheets (CNT1 to CNT5) according to Comparative Example 1, Examples 2 to 4 and Comparative Example 5, carbon nanotubes set out in Table 1 were used as the starting fibrous carbons. Single-walled CNT1 was a single-walled carbon nanotube (ZEONANO (registered trademark) SG101) manufactured by Zeon Technology Co., Ltd), and single-walled CNT2 was prepared by a chemical vapor deposition (CVD) process as mentioned below.

A silicon substrate on which Fe (2 nm)/$Al_2O_3$ (40 nm) was vapor deposited by sputter deposition was sealed in a tubular furnace, and then annealed at 750° C. for 6 minutes while He/$H_2$ mixed gas (at a mixing rate of 1/9) was fed at a flow rate of 1000 sccm under atmospheric pressure. Then, He/$H_2$ mixed gas containing 150 ppm of water and 10% ethylene was fed at a flow rate of 1000 sccm for 10 minutes for growth of a carbon nanotube aggregate or cluster on the silicon substrate as single-walled CNT2. Single-walled CNT1 and single-walled CNT2 were observed under a transmission electron microscope (TEM, JEOL, JEM-ARM200F) with the results of observation shown in FIGS. 4A and 4B.

Figure 5A:
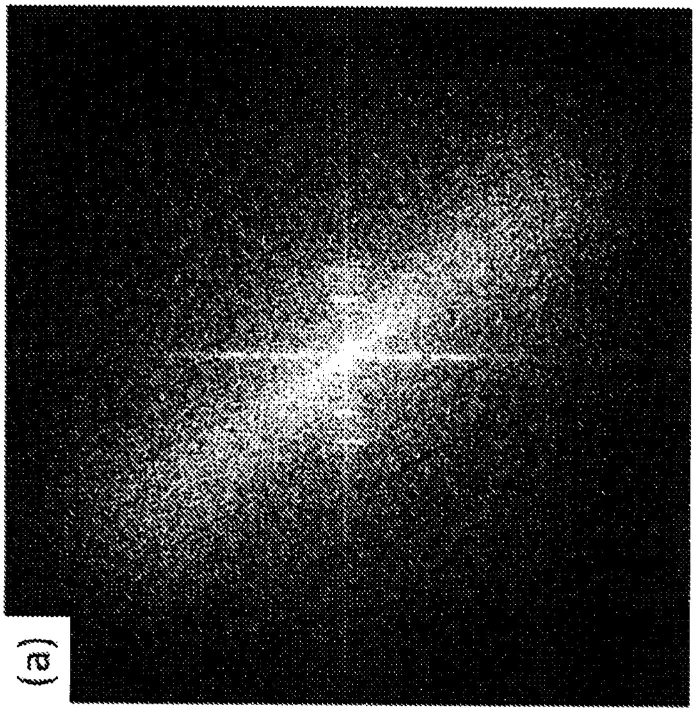
FIG. 5A is indicative of the Fourier-transformed image of the TEM image of FIG. 4A.
Figure 5B:
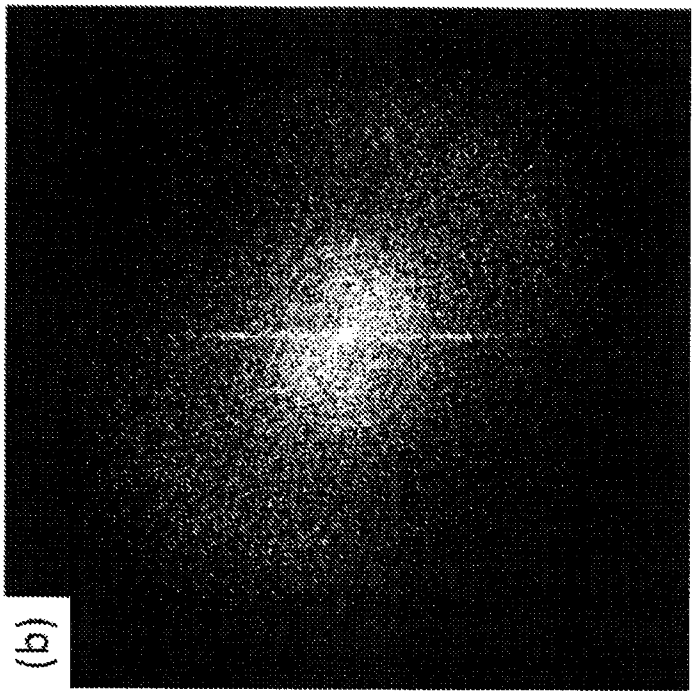
FIG. 5B is indicative of the Fourier-transformed image of the TEM image of FIG. 4B.
Figure 6:
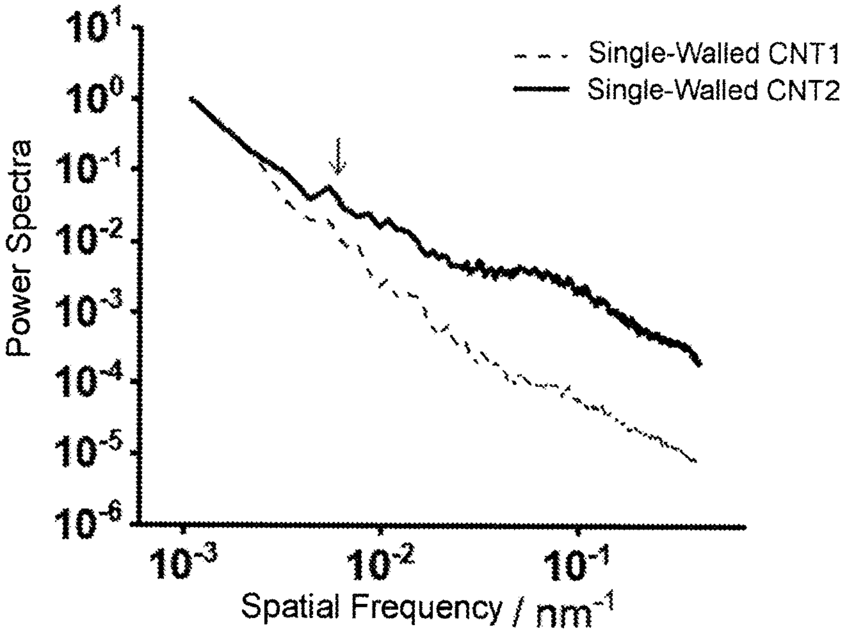
FIG. 6 is indicative of a radial direction distribution of power spectra relative to the Fourier-transformed image of FIGS. 5A and 5B.

Further, the Fourier-transformed images of TEM images and the power spectra calculated out of them were acquired using Image J (Version 1.53f) distributed by National Institutes of Health (NIH). The obtained Fourier-transformed images are shown in FIGS. 5A and 5B, and the obtained radial direction distribution of power spectra are shown in FIG. 6, respectively. As well known in the art, the radial direction distribution p(r) of power spectra is calculated as the sum of power spectral values in a minute annular region present at a distance r from the center of the respective Fourier-transformed images where r is a spatial frequency.

The pore volumes found by the BJH method and the BET method specific surface area of the starting carbon nanotubes (CNT) are set out in Table 1 given just below, respectively.

TABLE 1

List of the Starting Carbon Nanotubes

| Starting CNT | | BET Specific Surface Area | BJH Pore Volume |
|---|---|---|---|
| Type | Product Name | $m^2/g$ | (2-1000 nm) $cm^3/g$ |
| SW CNT1 | ZEONANO SG101 | 1210 | 9.1 |
| SW CNT2 | CVD* | 570 | 10.3 |

*Synthesized by CVD

Figure 4A:
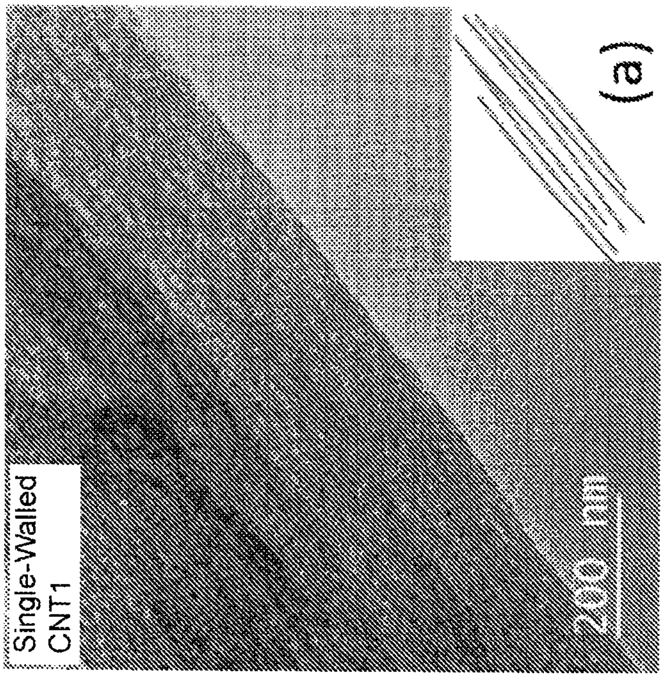
FIG. 4A is indicative of the TEM image of the starting monolayer or single-walled CNT1.
Figure 4B:
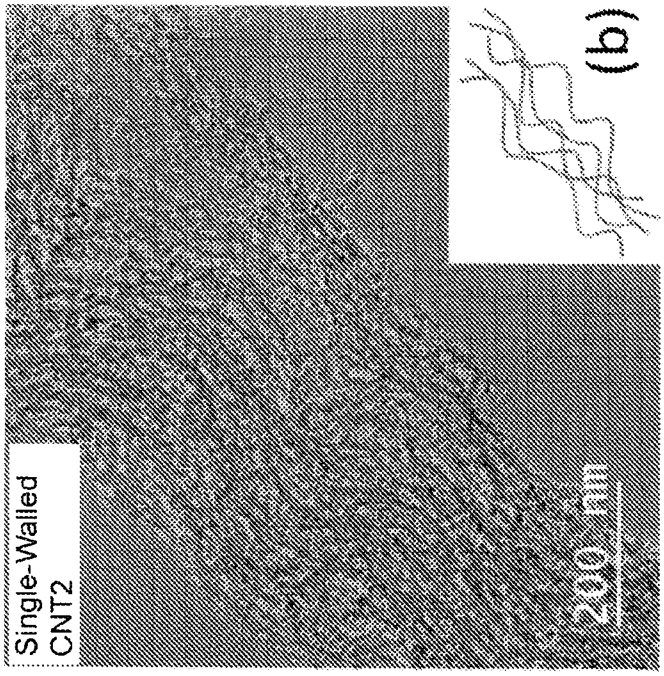
FIG. 4B is indicative of the TEM image of the starting monolayer or single-walled CNT2.

FIGS. 4A and 4B are indicative of TEM images of the starting single-walled CNT1 and single-walled CNT2, respectively.

From FIGS. 4A and 4B, it has been confirmed that the carbon nanotubes are each a single-walled carbon nanotube of 2 to 5 nm in diameter. It has also been found that single-walled CNT1 is in a linear form, but single-walled CNT2 is a waved carbon nanotube as can be seen from a distinctive undulation in a 200 nm spacing. The carbon nanotubes had an average aspect ratio of 500 to 100000 inclusive.

FIGS. 5A and 5B are indicative of the Fourier-transformed images of TEM images of FIGS. 4A and 4B, respectively.

FIG. 5A is the Fourier-transformed image of FIG. 4A (single-walled CNT1), and FIG. 5B is the Fourier-transformed image of FIG. 4B (single-walled CNT2). An anisotropic pattern indicated in FIG. 5A reflects a linear bundle aggregation of single-walled CNT1. On the other hand, the isotropic pattern indicated in FIG. 5B shows that single-walled CNT2 has a wide range of frequency components inclusive of high frequency components; single-walled has a nonlinear form.

FIG. 6 is illustrative of the radial direction distribution of power spectra calculated out of the Fourier-transformed image of FIGS. 5A and 5B.

As can be seen from FIG. 6, it has been identified that single-walled CNT2 has a peak with the vicinity of 0.005 $nm^{-1}$ as center, showing that single-walled CNT2 has a waved pattern of the order of 200 nm in period. As can be seen from FIGS. 4A, 4B, 5A, 5B and 6, it has been identified that the starting single-walled CNT2 is waved fibrous carbon, and has a power spectral component in a spatial frequency range of 0.002 to 0.2 $nm^{-1}$.

Physical Quality Estimations

The physical qualities of the sheets according to Comparative Example 1, Examples 2 to 4 and Comparative Example 5 (CNT1 to CNT5) given later were estimated as follows.

(1) Basis Weight

Each sheet was punched into a 16 mm diameter (ϕ) to measure its mass (mg), and the mass of the punched sheet per area was defined as basis weight ($mg/cm^2$).

(2) Sheet Density

The sheet density ($\rho_{sheet}$) is calculated by dividing the basis weight by the sheet thickness.

(3) Porosity

The porosity was calculated according to the following equation assuming that the sheet consisted only of carbon nanotubes having a true density of 1.3 $g/cm^3$.

$$\text{Porosity } (\%)=\{1-(\rho_{sheet}/1.3)\}\times 100$$

(4) BET Method Specific Surface Area

With the aid of 3Flex (made by Micromeritics Instrument Corp.), the specific surface area was found from adsorption isotherms obtained by nitrogen adsorption according to the BET method.

(5) Pore Volume Taken Up by Pores of 2 to 1000 nm in Diameter

With the aid of 3Flex (made by Micromeritics Instrument Corp.), the pore volume was found from adsorption isotherms obtained by nitrogen adsorption according to the BJH method.

(6) Pore Volume Taken Up by Pores of 0.1 to 10 μm in Diameter

With the aid of the mercury penetration method using AutoPore IV (Micromeritics Instrument Corp.), a pore volume in a pore diameter range of 10 to 200000 nm (0.01 to 200 μm) was measured to find a pore volume of pores of 0.1 to 10 μm in diameter.

(7) Pore Surface Area of Pores of 5 to 1000 nm in Diameter

With the aid of 3Flex (made by Micromeritics Instrument Corp.), the surface area was found from adsorption isotherms obtained by nitrogen adsorption according to the BJH method.

Estimation of Battery Characteristics

Discharge capacity and cycle performance were estimated as the battery characteristics of the sheets according to Comparative Example 1, Examples 2 to 4 and Comparative Example 5 (CNT1 to CNT5) given later.

(1) Discharge Capacity (Discharge Rate Performance)

A sheet was punched into a diameter of (ϕ) 16 mm, and dried in vacuo at 100° C. for longer than 12 hours to obtain a positive electrode sheet. Using a lithium metal foil (having a diameter of (ϕ) 16 mm and a thickness of 0.2 mm) as the negative electrode structure and a glass fiber paper (Whatman (registered trademark), GF/A) as the separator, the lithium metal foil, glass fiber paper and positive electrode sheet were stacked in this order, and the stack assembly was incorporated into a coin cell case (CR2032 model). Then, the assembly was permeated with an electrolyte (1M-tetraethylene glycol dimethyl ether solution of LiTFSI (lithium bis-trifluoromethane sulfonimide) to prepare a lithium air battery cell.

The resulting lithium air battery cell was used with a battery discharge/charge system (HJ1001SD8 available from Hokuto Denko) to measure a discharge capacity by the time the voltage went down to 2 V under conditions comprising a pure oxygen flow environment, room temperature (25° C.), and a constant current (in a range of 0.2 to 3.0 $mA/cm^2$).

Cycle Performance

A lithium air battery cell was fabricated as was the case with a lithium air battery cell for estimation of discharge rate performance except that a tetraethylene glycol dimethyl ether solution containing 0.5M of LiTFSI, 0.5M of $LiNO_3$ (lithium nitrate) and 0.2M of LiBr bromide) was used as an electrolyte in place of LiTFSI.

The resulting lithium air battery cell was used with a battery discharge/charge system (HJ1001SD8 available from Hokuto Denko) to repeat discharge/charge in a period of 10 hours under conditions comprising a pure oxygen flow environment, room temperature, and a constant current (of 0.4 $mA/cm^2$). With a discharge cut-off voltage of 2 V and a charge cut-off voltage of 4.5 V, the number of cycles until the discharge voltage reached the cut-off voltage of 2 V for the first time was counted to detract 1 from the number of cycles thereby determining the number of discharge/charge cycles.

Comparative Example 1, Examples 2 to 4, and Comparative Example 5

In Comparative Example 1, Examples 2 to 4 and Comparative Example 5, the carbon nanotubes set out in Table 1 were used to prepare positive electrode sheets under the preparation conditions described in Table 2. The preparation process will now be explained in details.

The starting single-walled CNT1 or CNT2 (90 mg) was added to a container charged with ultrapure water (30 g) for dispersion of the starting material using a homogenizer (HiFlex Homogenizer HF93 made by SMT Co., Ltd.) thereby obtaining a pre-dispersion solution (Step S110 in FIG. 1. The dispersion conditions comprised 9000 rpm and 3 minutes.

Then, ultrapure water (150 g) was added to the obtained pre-dispersion solution to regulate the concentration of single-walled CNT to 0.05% by mass. An ultrasonic homogenizer (450D manufactured by Branson with the maximum output of 400 W) was used for ultrasonic processing under the conditions set out in Table 2 thereby obtaining a dispersion solution (Step S120 in FIG. 1). The concentration of single-walled CNT in the dispersion solution was 0.05% by mass.

The resultant dispersion solution was poured onto a filter comprising a hydrophilic polytetrafluoroethylene (PTFE, Omnipore (registered trademark) JAWP made by Merck Co., Ltd. with a pore diameter of 1 μm) for filtration under the conditions set out in Table 2 (Step S130 in FIG. 1). Filtration was carried out with suction by a diaphragm type vacuum pump (N820.3FT.18 available from KNF Co., Ltd.). The obtained filtrate was removed from the filter followed by drying in vacuo at 60° C. for 12 hours. The sheets obtained in Comparative Example 1, Examples 2 to 4 and Comparative Example 5 are herein called CNT1 to CNT5, respectively.

TABLE 2

| Experimental Cond. for the Sheets of Examples 1-5 | | | |
|---|---|---|---|
| Example | Starting CNT | Disperse Medium | Pre-Dispersion Cond. |
| 1 (CNT1) | SW CNT1 | Water | 9000 rpm, 3 min. |
| 2 (CNT2) | SW CNT2 | Water | 9000 rpm, 3 min. |
| 3 (CNT3) | SW CNT2 | Water | 9000 rpm, 3 min. |
| 4 (CNT4) | SW CNT2 | Water | 9000 rpm, 3 min. |
| 5 (CNT1) | SW CNT2 | Water | 9000 rpm, 3 min. |

| Example | CNT Concentrations | Ultrasonic Processing Cond. Output | OF* | Time | Temp. |
|---|---|---|---|---|---|
| 1 (CNT1) | 0.05% by mass | 50 W | 20 KHz | 50 seconds | 25° C. |
| 2 (CNT2) | 0.05% by mass | 33 W | 20 KHz | 50 seconds | 25° C. |
| 3 (CNT3) | 0.05% by mass | 50 W | 20 KHz | 50 seconds | 25° C. |
| 4 (CNT4) | 0.05% by mass | 63 W | 20 KHz | 50 seconds | 25° C. |
| 5 (CNT5) | 0.05% by mass | 100 W | 20 KHz | 50 seconds | 25° C. |

| Example | Type | Filtration Suction Liquid Volume | Filtration Area |
|---|---|---|---|
| 1 (CNT1) | Suction | 180 mL | 45 $cm^3$ |
| 2 (CNT2) | Suction | 180 mL | 45 $cm^3$ |
| 3 (CNT3) | Suction | 270 mL | 45 $cm^3$ |
| 4 (CNT4) | Suction | 180 mL | 45 $cm^3$ |
| 5 (CNT5) | Suction | 270 mL | 45 $cm^3$ |

OF: Oscillation Frequency

The physical qualities of the sheets obtained in Comparative Example 1, Examples 2 to 4 and Comparative Example 5 were estimated as described above, with the results set out in Table 3, respectively. In addition, whether the sheets of Comparative Example 1, Examples 2 to 4 and Comparative Example 5 were capable of self-supporting or not was visually observed, and the details thereof were observed by an SEM or scan electron microscope (JSM-7800F made by JEOL). Subsequently, as was the case with the starting single-walled CNT, Fourier-transformed images were acquired from the obtained SEM images with calculation of power spectra. As to the sheets of Comparative Example 1, Example 2 and Comparative Example 5, the SEM images are shown in FIGS. 7A, 7B, 7D, 7E, 7G and 7H and the Fourier-transformed images thereof are shown in FIGS. 7C, 7F and 7I and the power spectra are shown in FIG. 8, respectively. Further, the sheets of Comparative Example 1, Examples 2 to 4 and Comparative Example 5 were each used as the positive electrode for estimation of the aforesaid battery performance. The results are shown in FIGS. 9A, 9B, 9C, 10A, 10B, 11A, 11B and Table 4, respectively.

The results are now summarized below.

The results of estimation of the physical qualities of the sheets according to Comparative Example 1, Examples 2 to 4 and Comparative Example 5 (CNT1 to CNT5) are set out in Table 3.

TABLE 3

| Physical Qualities of the Sheets of Examples 1 to 5 | | | |
|---|---|---|---|
| Example | Self-Supporting Capability | Basis Weight mg/$cm^3$ | Thickness μm |
| 1 (CNT1) | found | 2.1 | 130 |
| 2 (CNT2) | found | 2.1 | 280 |
| 3 (CNT3) | found | 3.1 | 260 |
| 4 (CNT4) | found | 2.0 | 100 |
| 5 (CNT5) | found | 2.9 | 120 |

TABLE 3-continued

| Example | Sheet Density g/$cm^3$ | Porosity % | BET Method Specific Surface Area $m^2$/g |
|---|---|---|---|
| 1 (CNT1) | 0.16 | 87 | 800 |
| 2 (CNT2) | 0.07 | 94 | 690 |
| 3 (CNT3) | 0.11 | 91 | 660 |
| 4 (CNT4) | 0.19 | 85 | 350 |
| 5 (CNT5) | 0.24 | 81 | 610 |

| Example | BJH Method Pore Volume (2-1000 nm) $cm^3$/g | BJH Method Pore Surface Area (5-1000 nm) $m^2$/g |
|---|---|---|
| 1 (CNT1) | 0.89 | 180 |
| 2 (CNT2) | 3.4 | 370 |
| 3 (CNT3) | 2.3 | 380 |
| 4 (CNT4) | 2.5 | 350 |
| 5 (CNT5) | 3.1 | 400 |

| Example | Mercury penetration Method Pore Volume (0.1-10 μm) $cm^3$/g |
|---|---|
| 1 (CNT1) | 4.1 |
| 2 (CNT2) | 8.7 |
| 3 (CNT3) | 5.2 |
| 4 (CNT4) | 2.6 |
| 5 (CNT5) | 2.0 |

CNT1 to CNT5 had all self-supporting capabilities. Each of CNT2 to CNT 5 used single-walled CNT2 as the starting material, and provided a sheet becoming more flexible with a decreasing ultrasonic processing output and harder with an increasing output.

FIGS. 7A to 7I show the SEM images and Fourier-transformed images of the sheets according to Comparative Example 1, Example 2 and Comparative Example 5, respectively.

Figure 7A:
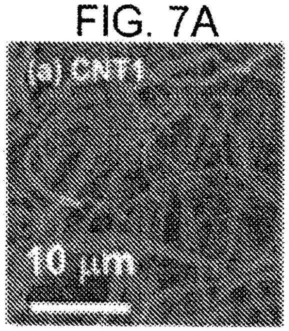
FIG. 7A is indicative of the SEM image of the sheet according to Comparative Example 1.
Figure 7B:
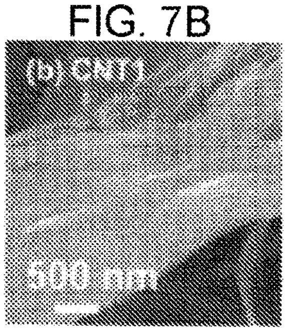
FIG. 7B is indicative of the SEM image of the sheet according to Comparative Example 1.
Figure 7C:
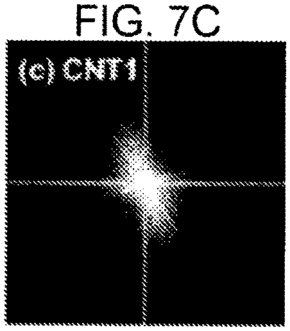
FIG. 7C is indicative of the Fourier-transformed image of the SEM image of the sheet according to Comparative Example 1.
Figure 7D:
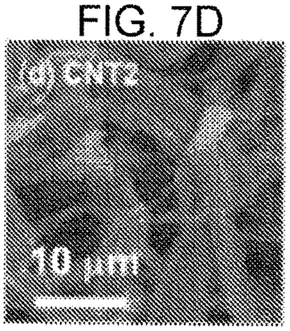
FIG. 7D is indicative of the SEM image of the sheet according to Example 2.
Figure 7E:
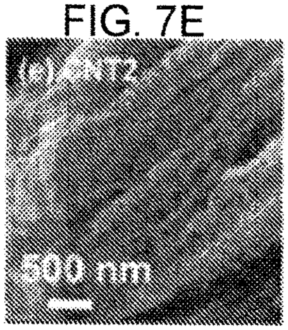
FIG. 7E is indicative of the SEM image of the sheet according to Example 2.
Figure 7F:
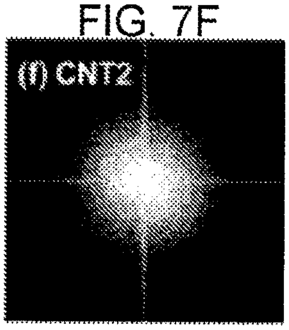
FIG. 7F is indicative of the Fourier-transformed image of the SEM image of the sheet according to Example 2.
Figure 7G:
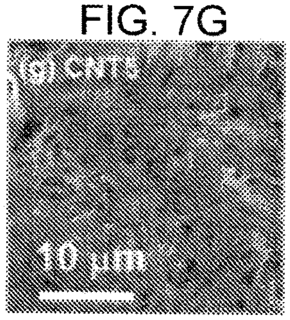
FIG. 7G is indicative of the SEM image of the sheet according to Comparative Example 5.
Figure 7H:
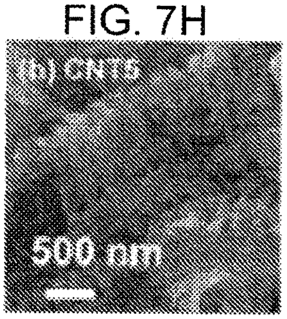
FIG. 7H is indicative of the SEM image of the sheet according to Comparative Example 5.
Figure 7I:
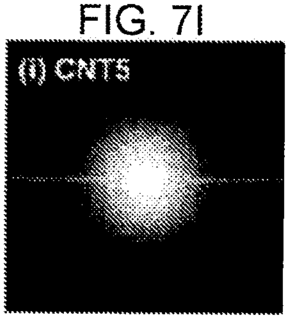
FIG. 7I is indicative of the Fourier-transformed image of the SEM image of the sheet according to Comparative Example 5.
Figure 8:
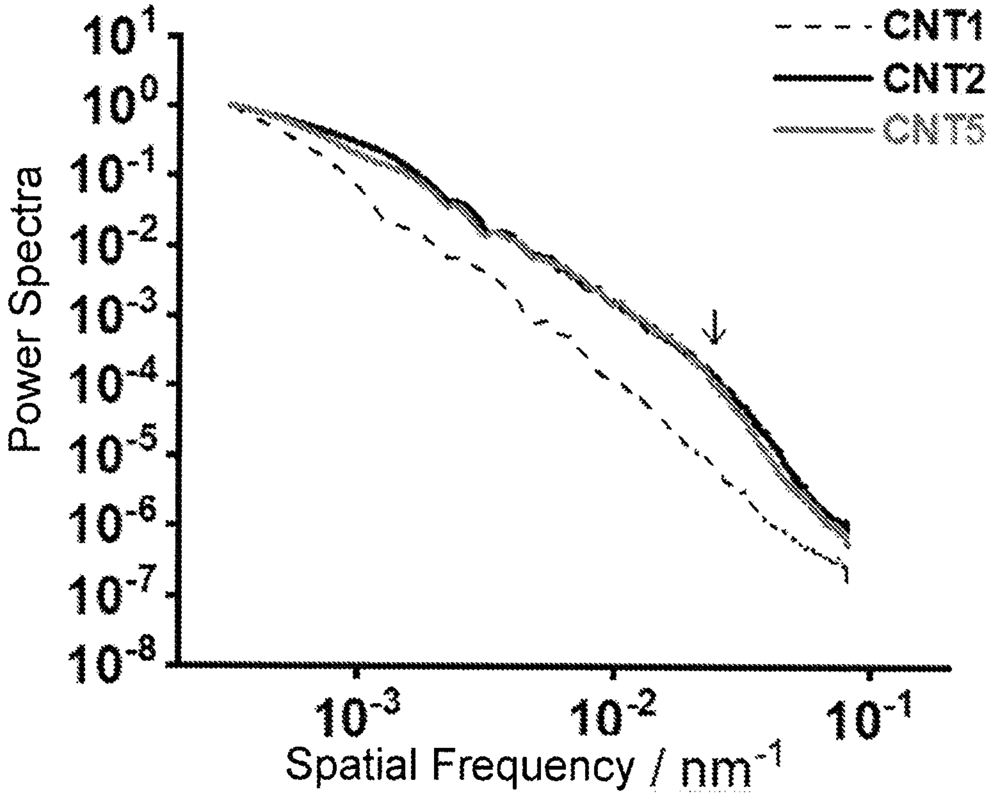
FIG. 8 is indicative of a radial direction distribution of power spectra relative to the Fourier-transformed image of FIGS. 7C, 7F and 7I.

FIGS. 7A to 7C are the SEM image and Fourier-transformed image thereof of CNT1 according to Comparative Example 1; FIGS. 7D to 7F are the SEM image and Fourier-transformed image thereof of CNT2 according to Example 2; and FIGS. 7G to 7I are the SEM image and Fourier-transformed image thereof of CNT5 according to Comparative Example 5.

In any case, it has been identified that the carbon nanotubes are tied up in a bundle to provide an unwoven fabric sheet. As can be seen from FIGS. 7D and 7E, CNT2 according to Example 2 comprised thick bundles of 0.1 to 10 μm and had, together with a large pore of 0.1 to 10 μm between bundles, a number of pores or voids of 200 nm or smaller stemming from waves of carbon nano-tubes forming a bundle. The then carbon nanotubes had an undulation having a period of 20 to 50 nm. From FIGS. 7G and 7H, it has been found that in CNT 5 according to Comparative Example 5, voids between bundles are crushed unlike CNT2 in Example 2. From FIGS. 7A and 7B, on the other hand, it has been found that as is the case with CNT2 in Example 2, CNT1 according to Comparative Example 1 comprises a relatively thick bundle of 0.1 to 10 μm and a large void of 0.1 to 10 μm between bundles, but pores of 200 nm or less are not found because the carbon nanotubes has not any undulation.

From FIG. 7C, moreover, it has been found that the Fourier-transformed image of CNT1 according to Comparative Example 1 shows an anisotropic pattern reflecting linear carbon nanotubes tied up in bundle form; as shown in FIGS.

7F and 7I, however, it has been found that both the Fourier-transformed images of CNT2 according to Example 2 and CNT5 according to Comparative Example 5 show an isotropic pattern reflecting waved carbon nanotubes tied up in coagulated form, and have a wide range of frequency components inclusive of high frequency ones.

Although not shown, the SEM images and Fourier-transformed images thereof of CNT3 according to Example 3 and CNT4 according to Example 4 were similar to those of CNT2 according to Example 2, respectively.

FIG. 8 shows a radial direction distribution of power spectra figured out of the Fourier-transformed images of FIGS. 7C, 7F and 7I.

As described above, CNT1 according to Comparative Example 1 decreased exponentially in its power spectra because of having no pores of 200 nm or less. On the other hand, CNT2 according to Example 2 and CNT5 according to Comparative Example 5 had a gentle peak with the vicinity of 0.025 $nm^{-1}$ as center. The presence of this peak indicates that pores of a size order of about 40 nm exist in the CNT bundles. Although not shown, the radial direction distributions of power spectra of CNT3 according to Example 3 and CNT4 according to Example 4 were also similar to that of CNT2 according to Example 2. From this, it has been understood that the sheets according to Examples 2 to 4 and Comparative Example 5 have a power spectral component in a spatial frequency range of 0.002 to 0.2 $nm^{-1}$, and the positive electrode sheets comprise waved carbon nanotubes.

It has further been identified that, as compared with the starting single-walled CNT2, the waved CNTs in the positive electrode sheets according to Examples 2 to 4 have a shorter period and a power spectral component in a greater spatial frequency domain.

Figure 9A:
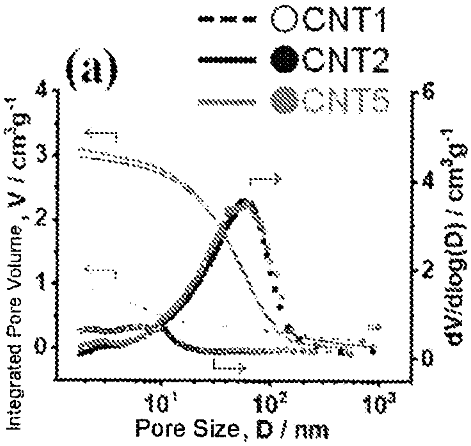
FIG. 9A is indicative of pore distributions of sheets according to Comparative Example 1, Example 2 and Comparative Example 5 as measured by nitrogen adsorption.
Figure 9B:
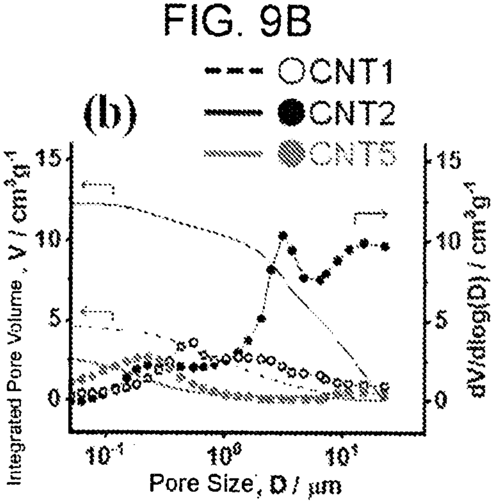
FIG. 9B is indicative of pore distributions of sheets according to Comparative Example 1, Example 2 and Comparative Example 5 as measured by the mercury penetration method.
Figure 9C:
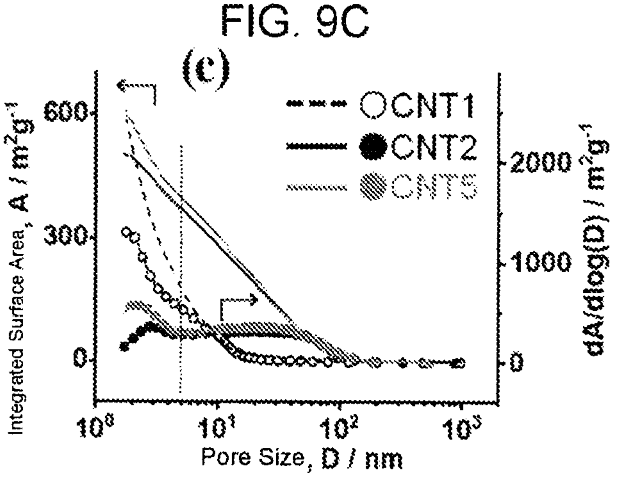
FIG. 9C is indicative of surface area pore size distributions of sheets according to Comparative Example 1, Example 2 and Comparative Example 5 as measured by nitrogen adsorption.

FIG. 9A shows the pore distributions of the sheets according to Comparative Example 1, Example 2 and Comparative Example 5 as measured by nitrogen adsorption, FIG. 9B shows the pore distributions of sheets according to Comparative Example 1, Example 2 and Comparative Example 5 as measured by the mercury penetration method, and FIG. 9C shows the surface area pore size distributions of sheets according to Comparative Example 1, Example 2 and Comparative Example 5 as measured by nitrogen adsorption.

Although CNT1 according to Comparative Example 1 had a minute pore in a region of 10 nm or less in pore size, its pore volume was less than 1 $cm^3/g$ in a 2 to 1000 nm region. CNT2 according to Example 2 and CNT5 according to Comparative Example 5 had a pore volume of 3 $cm^3/g$ or greater in a 2 to 1000 nm region. As explained with reference to FIGS. 7A to 7I and 8, this is ascribed to the fact that a wide pore distribution is formed in the bundle while CNTs are kept from coagulation in the waved CNT bundle.

While CNT1 according to Comparative Example 1 and CNT2 according to Example 2 had a pore volume of 2.0 $cm^3/g$ or greater in a 0.1 to 10 μm region, CNT5 according to Comparative Example 5 had a pore volume of 2.0 $cm^3/g$ or less in a 0.1 to 10 μm region. CNT5 according to Comparative Example 5 in particular had no or little pore in a region of 1 μm or greater. This is ascribed to the fact that in CNT5 according to Comparative Example 5, pores between the bundles are crushed.

While CNT1 of Comparative Example 1 had a pore surface comprising minute pores in a region of 10 nm or less in pore size, its surface area was below 200 $m^2/g$ although limited to a pore region of 5 nm or greater. CNT2 of Example 2 and CNT5 of Comparative Example 5 had a pore surface comprising pores distributed widely over a region of 2 to 1000 nm with its surface area being greater than 200 $m^2/g$ in a region of 5 nm or greater. This is ascribed to the fact that a wide pore distribution is formed in the bundle while CNTs are kept from coagulation in the waved CNT bundle.

According to Table 3, CNT2, CNT3 and CNT4 according to Examples 2, 3 and 4, each comprising waved fibrous carbons, had a BET method specific surface area in a range of 300 to 1200 $m^2/g$, a pore surface area of pores of 5 to 1000 nm in diameter in a range of 200 to 600 $m^3/g$, a pore volume of pores of 0.1 to 10 μm in diameter in a range of more than 2.0 $cm^3/g$ to not more than 10.0 $cm^3/g$, a pore volume of pores of 2 to 1000 nm in diameter in a range of 1.0 to 5.0 $cm^3/g$, and a sheet density in a range of 0.05 to 0.23 $g/cm^3$.

Although not shown, it has been identified that as a result of Raman spectrometry (for the purpose of using a Raman spectrometer Touch-VIS-NIR made by NanophotonCorporation) to observe Raman spectra with an objective lens 10× in an excitation wavelength of 532 nm and an irradiation laser power of 1 mW thereby finding Raman spectrum's peak intensity G derived from crystal structure carbon and Raman spectrum's peak intensity D derived from turbostratic structure carbon), D/G is in a range of 0.2 to 0.8.

From the foregoing, it has been shown that by carrying out the inventive process indicated in FIG. 1 with the use of the starting waved fibrous carbon material, a self-supporting unwoven fabric sheet comprising waved fibrous carbons is obtained with a BET method specific surface area of 300 to 1200 $m^2/g$, a 5 to 1000 nm-diameter pore surface area of 200 to 600 $m^2/g$, a 0.1 to 10 μm-diameter pore volume of more than 2.0 $cm^3/g$ to not more than 10.0 $cm^3/g$, a 2 to 1000 nm-diameter pore volume of 1.0 to 5.0 $cm^3/g$, and a sheet density of 0.05 to 0.23 $g/cm^3$.

Figure 10B:
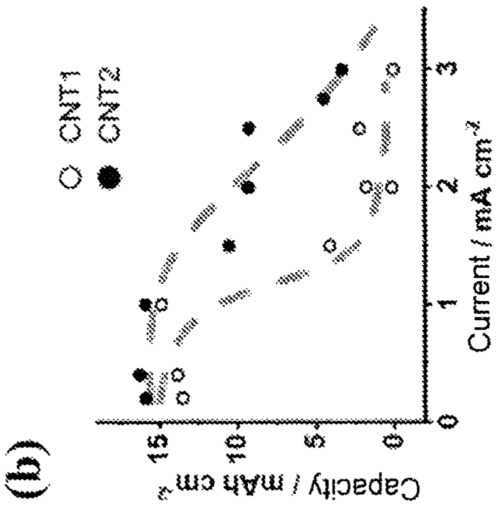
FIG. 10B is indicative of discharge current vs. discharge capacity relations of air batteries using the sheets of Comparative Example 1 and Example 2.
Figure 10A:
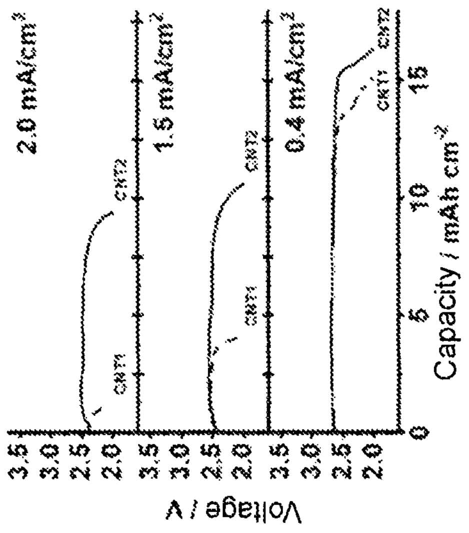
FIG. 10A is indicative of discharge curves of air batteries using the sheets of Comparative Example 1 and Example 2.

FIG. 10A shows discharge curves of the air batteries using the sheets according to Comparative Example 1 and Example 2, and FIG. 10B shows discharge current vs. discharge capacity relations of the air batteries using the sheets of Comparative Example 1 and Example 2.

In FIGS. 10A and 10B, the discharge capacity and output rate were normalized with an electrode area (ϕ16 mm, 2 $cm^2$). According to FIG. 10A, the air batteries using CNT1 of Comparative Example 1 and CNT2 of Example 2 each showed a discharge capacity exceeding 15 $mAh/cm^2$ at a low rate (0.4 $mA/cm^2$). In the air battery using CNT1 of Comparative Example 1, however, the discharge capacity went quickly down to 4 $mAh/cm^2$ at an output rate increased to 1.5 $mA/cm^2$, and decreased to 2 $mAh/cm^2$ at an output rate increased to a further 2.0 $mA/cm^2$. In the air battery using CNT2 of Example 2, on the other hand, the discharge capacity of 10 $mAh/cm^2$ was maintained at either output rate. Although not shown, the air batteries using CNT3 of Example 3 and CNT4 of Example 4 also showed such similar tendencies as CNT2 of Example 2.

According to FIG. 10B, the air battery using CNT2 of Example 2 showed a high discharge capacity even at a high rate exceeding 1.5 $mA/cm^2$. To the contrary, the air battery using CNT1 of Comparative Example 1 was substantially incapable of discharge at an output rate exceeding 1.5 $mA/cm^2$. Although not shown, the air batteries using CNT3 of Example 3 and CNT4 of Example 4 also showed such similar tendencies as CNT2 of Example 2.

TABLE 4

Discharge Capacities of the Air Batteries Using the Sheets of Examples 1, 2, 4 and 5

| Example | Discharge Capacities at 0.2 $mAcm^{-2}$, $mAhg^{-1}$ | Discharge Capacities at 2.5 $mAcm^{-2}$, $mAhg^{-1}$ |
|---|---|---|
| 1 (CNT1) | 6400 | 1100 |
| 2 (CNT2) | 7600 | 4000 |
| 4 (CNT4) | 6700 | 2700 |
| 5 (CNT5) | 5400 | 760 |

Table 4 shows the discharge capacities of the air batteries using the sheets of Comparative Example 1, Examples 2 and 4 as well as Comparative Example 5. The discharge capacity was standardized in terms of electrode mass, i.e., basis weight. In any of the air batteries using these sheets, a capacity of 5000 mAh/g or more per electrode mass was obtained at a low rate (0.2 mA/cm), but in the air batteries using CNT1 of Comparative Example 1 and CNT5 of Comparative Example 5, the discharge capacity dropped drastically at a high rate (2.5 $mA/cm^2$). One possible reason for this would be that CNT 1 of Comparative Example 1 has no or little pores in a 2 to 1000 nm region and CNT5 of Comparative Example 5 has no or little void between the bundles in 0.1 to 10 μm region, resulting in insufficient oxygen supply to the carbon surface providing a battery reaction site.

On the other hand, the air batteries using CNT2 of Example 2 and CNT4 of Example 4 showed a discharge capacity far exceeding 2000 mAh/g even at a high rate (2.5 $mA/cm^2$). This would be considered to be due to the fact that both CNT2 and CNT4 have a sufficient pore volume in either of the 2 to 1000 nm pore region and the 0.1 to 10 μm pore region, resulting in improvements in the capability of supplying oxygen to the battery reaction site and much more enhancements in high output capacity. It has also been identified that the air battery using CNT3 of Example 3 show a discharge capacity exceeding 2000 mAh/g at high rates.

Figure 11B:
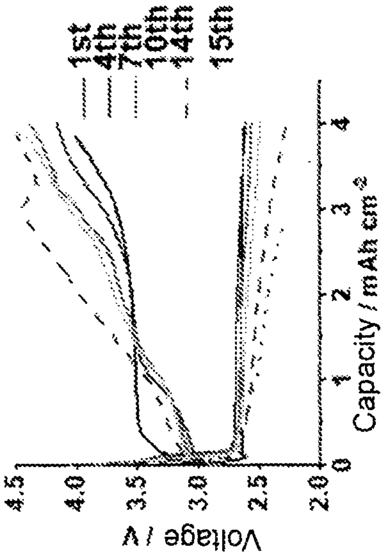
FIG. 11B is indicative of discharge-and-charge curves of the air battery using the sheet of Example 2.
Figure 11A:
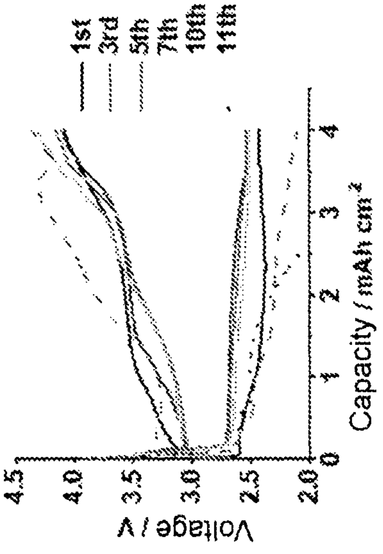
FIG. 11A is indicative of discharge-and-charge curves of the air battery using the sheet of Comparative Example 1.

FIG. 11A shows the discharge/charge curves of the air batteries using the sheet according to Comparative Example 1, and FIG. 11B shows the discharge/charge curves of the air batteries using the sheets according to Example 2.

According to FIG. 11A, the air battery using CNT1 of Comparative Example 1 was capable of discharging/charging 10 times. According to FIG. 11B, on the other hand, the air battery using CNT2 of Example 2 was capable of discharging and charging 14 times, leading to an improvement in discharge/charge cycle. This is ascribed to the fact that CNT2 of Example 2 has a sufficient pore volume in both the 2 to 1000 nm pore region and the 0.1 to 10 μm pore region, rendering the oxygen supply capability high. Although not shown, the air batteries using the sheets of Examples 3 and 4 were also capable of discharging/charging 10 times or more.

INDUSTRIAL APPLICABILITY

The inventive positive electrode sheet for air batteries comprises waved fibrous carbons, and by using this for a positive electrode of an air battery, it is possible to provide an air battery having a high capacity and excelling in fast discharge performance and cycle performance as well thanks to its high air or oxygen dispersion feature, its high ion transport efficiency and its wide reaction site. Moreover, the positive electrode sheet comprising fibrous carbons has a self-supporting feature enough to be applied by itself to a positive electrode without recourse to any collector comprising metal mesh; it is capable of providing an air battery that is small in size and weight and can have a large capacity. For this reason, it is expected that the present invention will be used for air batteries for which demand will grow greatly in the future.

EXPLANATION OF THE NUMERICAL REFERENCES

100: Negative Electrode Structure
500: Air Battery
510: Positive Electrode Structure
520: Negative Electrode Collector
525: Positive Electrode Collector
540: Separator
550: Positive Electrode Sheet
560: Gas Diffusion Layer
600: Air Battery
610: Negative Electrode Structure
620: Positive Electrode Structure
630: Cramp Assembly
635: Negative Electrode Collector
640: Metal Layer (Negative Electrode Active Substance Layer)
650: Spacer
660: Separator
670: Space
680: Metal Mesh (Positive Electrode Collector)
690: Positive Electrode Sheet

What is claimed is:

1. A positive electrode sheet for air batteries comprising:
a waved fibrous carbon composed of a monoatomic layer sheet-like carbon bonded by sp2 hybrid orbital and in a fibrous form having an average diameter of 0.1 to 50 nm and an average length of the order of 1 to 100 μm,
wherein the positive electrode sheet has:
a BET method specific surface area in a range of 300 to 1200 $m^2/g$,
a 5 to 1000 nm-diameter pore surface area in a range of 200 to 600 $m^2/g$,
a 0.1 to 10 μm-diameter pore volume in a range of more than 2.0 $cm^3/g$ to not more than 10.0 $cm^3/g$,
a 2 to 1000 nm-diameter pore volume in a range of 1.0 to 5.0 $cm^3/g$, and
a sheet density in a range of 0.05 to 0.23 $g/cm^3$.

2. The positive electrode sheet according to claim 1, wherein said 0.1 to 10 μm-diameter pore volume is in a range of 2.5 to 9.0 $cm^3/g$.

3. The positive electrode sheet according to claim 2, wherein said 0.1 to 10 μm-diameter pore volume is in a range of 2.6 to 8.7 $cm^3/g$.

4. The positive electrode sheet according to claim 1, wherein said 2 to 1000 nm-diameter pore volume is in a range of 2.0 to 4.0 $cm^3/g$.

5. The positive electrode sheet according to claim 4, wherein said 2 to 1000 nm-diameter pore volume is in a range of 2.5 to 3.5 $cm^3/g$.

6. The positive electrode sheet according to claim 1, wherein said waves have a power spectrum component in a spatial frequency domain of 0.002 to $0.2 nm^{-1}$.

7. The positive electrode sheet according to claim 1, wherein said BET method specific surface area is in a range of 350 to 700 $m^2/g$.

8. The positive electrode sheet according to claim 7, wherein said BET method specific surface area is in a range of 550 to 690 $m^2/g$.

9. The positive electrode sheet according to claim 1, wherein said sheet density is in a range of 0.05 to 0.2 $g/cm^3$.

10. The positive electrode sheet according to claim 9, wherein said sheet density is in a range of 0.07 to 0.19 $g/cm^3$.

11. The positive electrode sheet according to claim 1, wherein said fibrous carbon is selected from a group consisting of carbon nanotubes, carbon nanohoms, and carbon nanofibers.

12. The positive electrode sheet according to claim 1, wherein a part of said fibrous carbon is in a bundled state.

13. The positive electrode sheet according to claim 1, wherein said positive electrode sheet has a porosity in a range of 80 to 95%.

14. The positive electrode sheet according to claim 1, wherein said positive electrode sheet has a basis weight in a range of 2 to 3.5 $mg/cm^2$.

15. A process of fabricating the positive electrode sheet for air batteries according to claim 1, which comprises:

dispersing a waved fibrous carbon in a solvent to obtain a pre-dispersion solution of the fibrous carbon, adding an additional solvent to the pre-dispersion solution to process the pre-dispersion solution with an ultrasonic wave having an oscillation frequency in a range of 20 to 60 kHz and a rated output of 30 to 95 W for 10 to 600 seconds to obtain a dispersion solution, and filtrating the dispersion solution through a filter.

16. The process according to claim 15, wherein said fibrous carbon has a BET method specific surface area in a range of 500 to 1200 $m^2/g$, and a 2 1000 nm-diameter pore volume in a range of 9.5 to 15.0 $cm^3/g$.

17. The process according to claim 15, where said waves have a power spectrum component in a spatial frequency domain of 0.002 to 0.2 $nm^{-1}$.

18. The process according to claim 15, wherein said fibrous carbon has a concentration of 0.005 to 0.3% by mass in the aforesaid dispersion solution.

19. An air battery, comprising a positive electrode, a negative electrode, and metal ion conductive electrolyte filled up between said positive electrode and said negative electrode, wherein said positive electrode comprises the positive electrode sheet according to claim 1.

20. The air battery according to claim 19, wherein said negative electrode comprises a lithium metal layer, and wherein said metal ion is a lithium ion.

* * * * *